(12) United States Patent
Lee et al.

(10) Patent No.: US 11,533,005 B2
(45) Date of Patent: Dec. 20, 2022

(54) ELECTRONIC DEVICE WITH STRUCTURE FOR HARVESTING ENERGY

(71) Applicant: Samsung Electronics Co., Ltd., Suwon-si (KR)

(72) Inventors: Sangheon Lee, Suwon-si (KR); Seongjin An, Suwon-si (KR); Bookeun Oh, Suwon-si (KR); Jaeyeon Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 122 days.

(21) Appl. No.: 17/118,899

(22) Filed: Dec. 11, 2020

(65) Prior Publication Data

US 2021/0184601 A1 Jun. 17, 2021

(30) Foreign Application Priority Data

Dec. 11, 2019 (KR) .................. 10-2019-0164433

(51) Int. Cl.
| | |
|---|---|
| *H02N 2/18* | (2006.01) |
| *H02J 50/00* | (2016.01) |
| *H02J 50/15* | (2016.01) |
| *G06F 3/0354* | (2013.01) |
| *G06F 3/041* | (2006.01) |

(52) U.S. Cl.
CPC ............ *H02N 2/186* (2013.01); *H02J 50/001* (2020.01); *H02J 50/005* (2020.01); *H02J 50/15* (2016.02);
(Continued)

(58) Field of Classification Search
None
See application file for complete search history.

(56) References Cited

U.S. PATENT DOCUMENTS 9,348,450 B1 * 5/2016 Kim ..................... G06F 1/1616
9,753,538 B2 9/2017 Hong et al.
(Continued)

FOREIGN PATENT DOCUMENTS

JP 6133050 B2 5/2017
JP 2018-500865 A 1/2018
(Continued)

OTHER PUBLICATIONS

International Search Report of the International Searching Authority in connection with International Application No. PCT/KR2020/016935 dated Mar. 5, 2021, 4 pages.
(Continued)

*Primary Examiner* — Nicholas J Lee

(57) ABSTRACT

An electronic device includes a housing structure including a first cover facing in a first direction and forming a first surface of the electronic device, and a second cover facing in a second direction opposite to the first direction and forming a second surface of the electronic device. The electronic device also includes a display positioned in a space formed by the housing structure and exposed through the first surface. The electronic device further includes an energy harvesting structure positioned in the space and configured to generate a current from a contact input to the first surface and a sound input generated inside and outside the electronic device. The electronic device additionally includes a battery positioned in the space. The electronic device also includes a charging circuit configured to charge the battery using the current received from the energy harvesting structure.

18 Claims, 22 Drawing Sheets

(52) U.S. Cl.
CPC .......... *G06F 3/03545* (2013.01); *G06F 3/041* (2013.01); *G06F 2203/04102* (2013.01)

(56) References Cited

U.S. PATENT DOCUMENTS

| | | |
|---|---|---|
| 2014/0313141 A1 | 10/2014 | Park et al. |
| 2014/0334076 A1 | 11/2014 | Baldwin |
| 2016/0020713 A1 | 1/2016 | Yang et al. |
| 2017/0228072 A1 | 8/2017 | Amin et al. |
| 2017/0317611 A1 | 11/2017 | Baik et al. |
| 2019/0339739 A1 | 11/2019 | Park et al. |
| 2020/0006587 A1 | 1/2020 | Park et al. |
| 2021/0232246 A1* | 7/2021 | Xu .......................... G06F 3/041 |

FOREIGN PATENT DOCUMENTS

| | | |
|---|---|---|
| KR | 10-1025562 B1 | 3/2011 |
| KR | 10-2012-0133581 A | 12/2012 |
| KR | 10-2014-0126607 A | 10/2014 |
| KR | 10-2018-0023464 A | 3/2018 |
| KR | 10-2018-0098046 A | 9/2018 |
| KR | 10-1960447 B1 | 3/2019 |
| KR | 10-2019-0127074 A | 11/2019 |

OTHER PUBLICATIONS

Cui et al., "High performance sound driven triboelectric nanogenerator for harvesting noise energy", Nano Energy, May 5, 2015, 8 pages.

\* cited by examiner

ELECTRONIC DEVICE WITH STRUCTURE FOR HARVESTING ENERGY

CROSS-REFERENCE TO RELATED APPLICATION

This application is based on and claims priority under 35 U.S.C. 119 to Korean Patent Application No. 10-2019-0164433 filed on Dec. 11, 2019 in the Korean Intellectual Property Office, the disclosure of which is herein incorporated by reference in its entirety.

BACKGROUND

1. Field

Various embodiments relate to an electronic device configured to harvest energy.

2. Description of Related Art

An electronic device may harvest energy from a contact input using a piezoelectric element or may harvest energy from a sound or a vibration using an electromagnetic induction method or an electrostatic induction phenomenon. The electronic device may convert the harvested energy into electrical energy to charge a battery.

SUMMARY

Energy may be effectively harvested from a contact input or a sound input. However, it may be difficult to simultaneously harvest energy from the inputs. For example, the contact input may act as an impediment to harvesting energy from the sound input.

Various embodiments of the disclosure may provide an electronic device having a structure for harvesting electrical energy from a contact input and a sound input.

Various embodiments of the disclosure may provide an electronic device having a structure for harvesting electric energy even in a situation in which a contact input and a sound input are simultaneously generated. For example, the electronic device may convert sound energy into electrical energy while a display is in contact (e.g., touch, drag, or scroll).

According to various embodiments of the disclosure, an electronic device may include a housing structure including a first cover facing in a first direction and forming a first surface of the electronic device, and a second cover facing in a second direction opposite to the first direction and forming a second surface of the electronic device; a display positioned in a space formed by the housing structure and exposed through the first surface; an energy harvesting structure positioned in the space and configured to generate a current from a contact input to the first surface and a sound input generated inside and outside the electronic device; a battery positioned in the space; and a charging circuit configured to charge the battery using the current received from the energy harvesting structure.

According to various embodiments of the disclosure, an electronic device may include a hinge structure; a first housing structure including a first front cover forming a portion of a first surface of the electronic device and a first rear cover forming a portion of a second surface of the electronic device; a second housing structure including a second front cover rotatably coupled to the first housing structure through the hinge structure and forming another portion of the first surface, and a second rear cover forming another portion of the second surface; a display positioned in a space formed by the first housing structure and the second housing structure and exposed through the first surface; an energy harvesting structure positioned in the space and configured to generate a current from a contact input to the first surface and a sound input generated inside and outside the electronic device; a battery positioned in the space; and a charging circuit configured to charge the battery using a current received from the energy harvesting structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
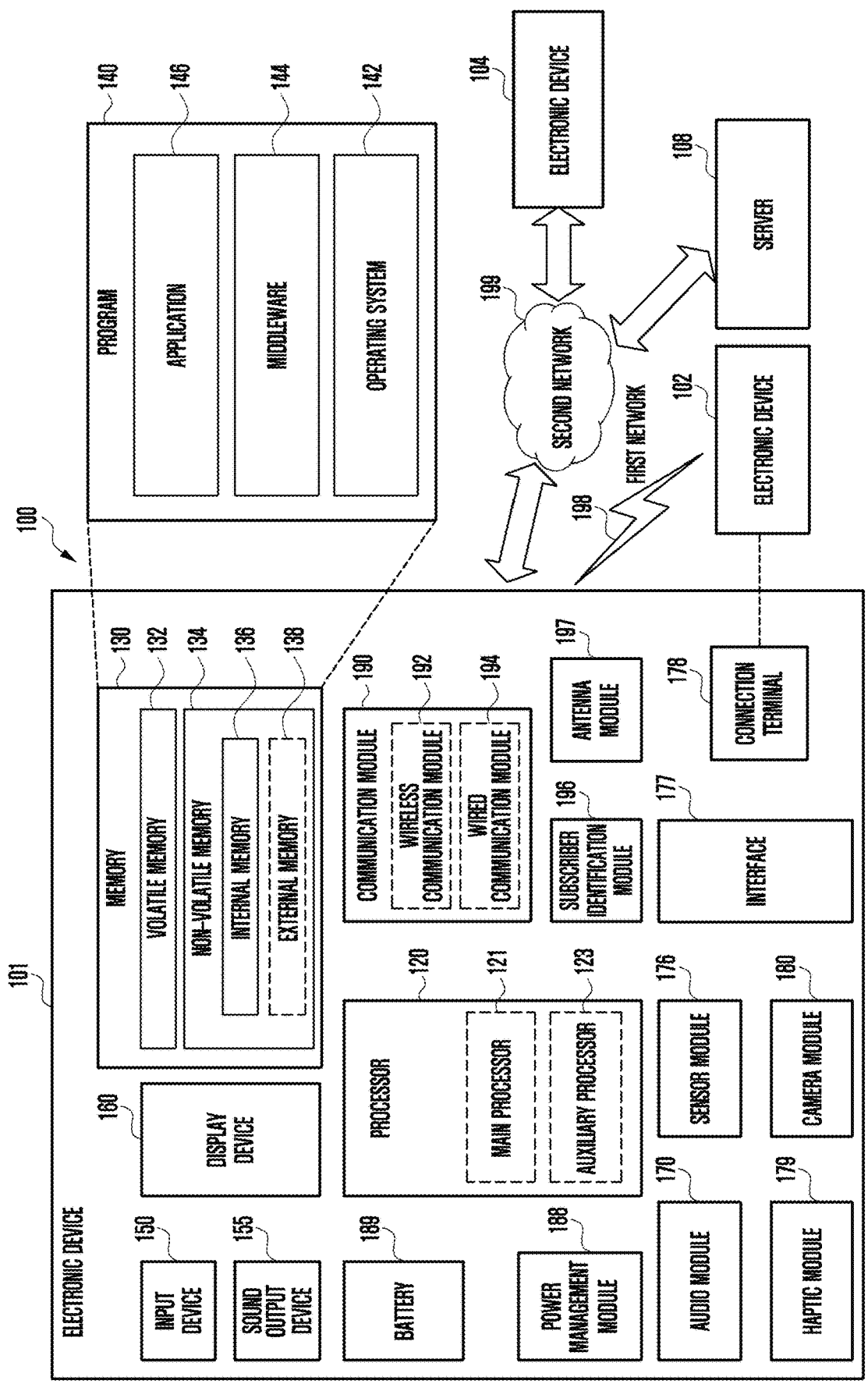
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output device 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural processing unit) may include a hardware structure specialized for processing an artificial intelligence model. Artificial intelligence models can be created through machine learning. Such learning may be performed, for example, in the electronic device 101 itself on which artificial intelligence is performed, or may be performed through a separate server (for example, the server 108). The learning algorithm may include, for example, supervised learning, unsupervised learning, semi-supervised learning, or reinforcement learning, but is not limited the above-described example. The artificial intelligence model may include a plurality of artificial neural network layers. Artificial neural networks may include a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more of the above, but is not limited to the above-described example. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, 5G network, next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology after a 4G network, for example, a new radio (NR) access technology. The NR access technology may support high-speed transmission of high-capacity data (enhanced mobile broadband (eMBB)), minimization of terminal power and connection of multiple terminals (massive machine type communications (eMTC)), or high reliability and low latency (ultra-reliable and low-latency (URLLC)). The wireless communication module 192 may support a high frequency band (eg, mmWave band), for example, to achieve a high data rate. The wireless communication module 192 may support various technologies for securing performance in a high frequency band, for example, beamforming, massive MIMO (multiple-input and multiple-output), FD-MIMO (full dimensional MIMO), array antennas, analog beam-forming, or large scale antennas. The wireless communication module 192 may support various requirements specified in the electronic device 101, an external electronic device (e.g., the electronic device 104), or a network system (e.g., the second network 199). According to an embodiment, the wireless communication module 192 may support a peak data rate for realizing eMBB (e.g., 20 Gbps or more), loss coverage for realizing mMTC (e.g., 164 dB or less), or U-plane latency for realizing URLLC (e.g., downlink (DL) and uplink (UL) each 0.5 ms or less, or round trip 1 ms or less).

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC that is disposed on or adjacent to a first side (eg, a lower side) of the printed circuit board and capable of supporting a designated high frequency band (e.g., mmWave band), and a plurality of antennas (e.g., array antennas) that are disposed on or adjacent to the second side (e.g., top or side) of the printed circuit board and capable of transmitting or receiving a signal of the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, MEC (mobile edge computing), or client-server computing technology may be used, for example. The electronic device 101 may provide an ultra-low delay service using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or healthcare) based on 5G communication technology and IoT-related technology.

Figure 2:
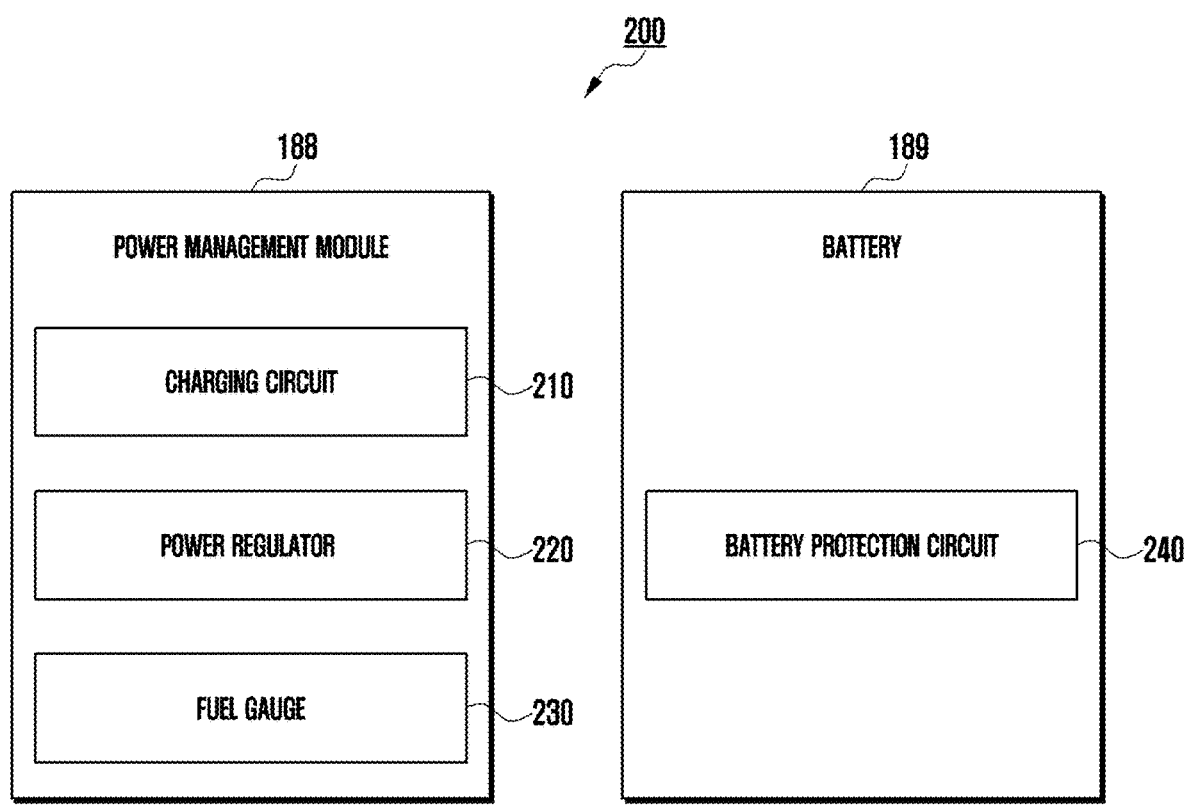
FIG. 2 illustrates a block diagram of a power management module and a battery according to various embodiments.

FIG. 2 is a block diagram 200 illustrating the power management module 188 and the battery 189 according to various embodiments. Referring to FIG. 2, the power management module 188 may include charging circuit 210, a power adjuster 220, or a power gauge 230. The charging circuit 210 may charge the battery 189 by using power supplied from an external power source outside the electronic device 101. According to an embodiment, the charging circuit 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuit 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed on different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
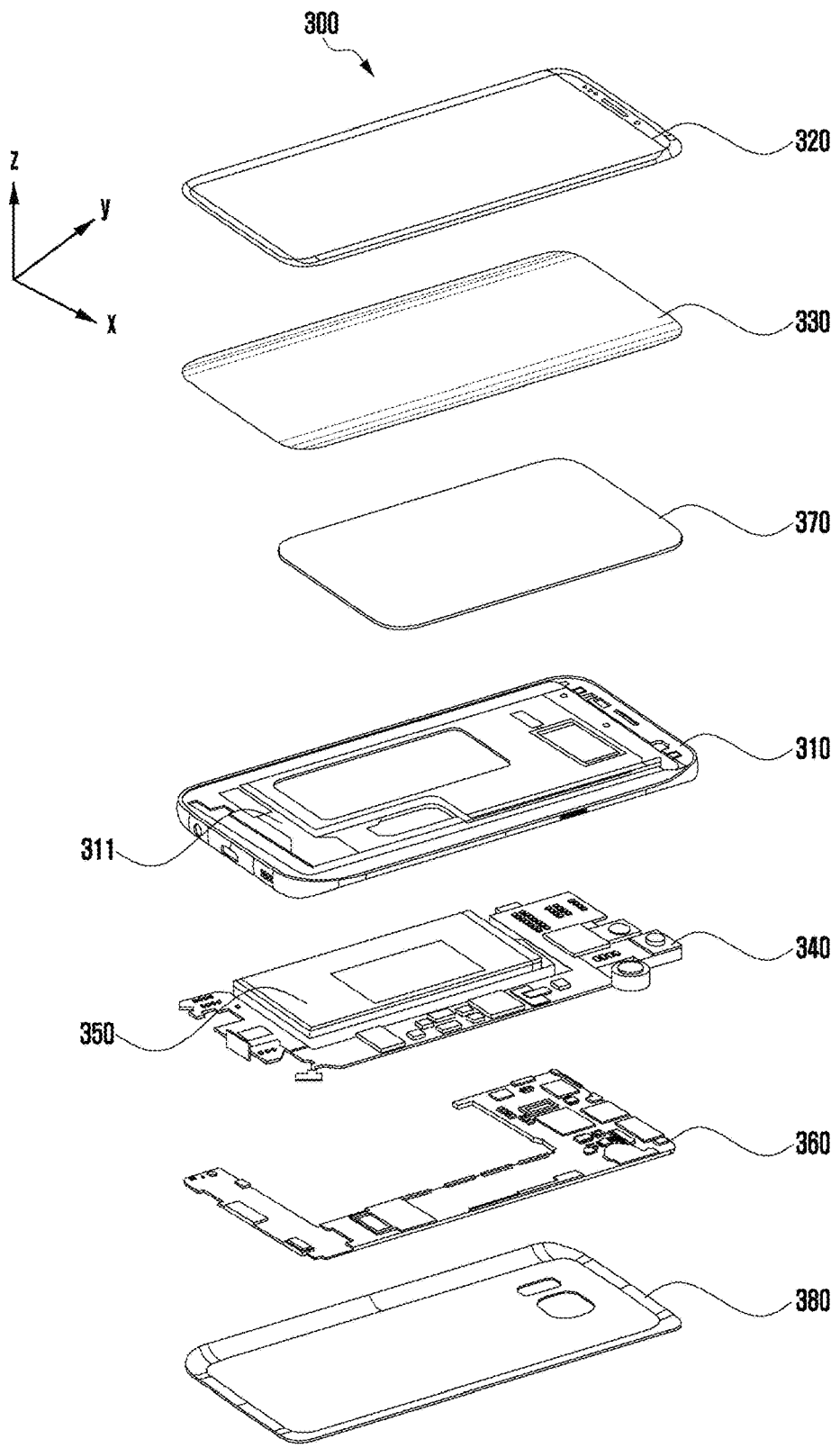
FIG. 3 illustrates an exploded perspective view of an electronic device according to an embodiment.

FIG. 3 illustrates an exploded perspective view of an electronic device 300 according to an embodiment. With reference to FIG. 3, the electronic device 300 (e.g., the electronic device 101 of FIG. 1) may include a side bezel structure 310, first support member 311 (e.g., bracket), front plate (or first cover) 320 (e.g., glass), display 330, printed circuit board 340, battery 350, second support member 360 (e.g., rear case), rear plate (or second cover) 380, and energy harvesting structure 370. The front plate 320 may form a first surface (or front surface) of the electronic device 300 facing in a first direction, the rear plate 380 may form a second surface (or rear surface) of the electronic device 300 facing in a second direction opposite to the first direction, and the side bezel structure 310 may form a side surface enclosing a space between the first surface and the second surface. According to an embodiment, a structure including the first surface, the second surface, and the side surface may be referred to as a housing structure. In some embodiments, the electronic device 300 may omit at least one (e.g., the first support member 311 or the second support member 360) of the components or may additionally include other components.

The first support member 311 may be disposed inside the electronic device 300 to be connected to the side bezel structure 310 or may be integrally formed with the side bezel structure 310. The first support member 311 may be made of, for example, a metal material and/or a non-metal (e.g., polymer) material. The display 330 may be coupled to one surface of the first support member 311, and the printed circuit board 340 may be coupled to the other surface thereof. The display 330 may be exposed through the front surface. A processor, memory, and/or interface may be mounted in the printed circuit board 340. The processor (e.g., the processor 120 of FIG. 1) may include, for example, one or more of a central processing unit, application processor, graphic processing unit, image signal processor, sensor hub processor, or communication processor. The memory may include, for example, a volatile memory or a nonvolatile memory. The interface may include, for example, a high definition multimedia interface (HDMI), universal serial bus (USB) interface, secure digital (SD) card interface, and/or audio interface. The interface may, for example, electrically or physically connect the electronic device 300 to an external electronic device and include a USB connector, SD card/multimedia card (MMC) connector, or audio connector.

The battery 350 is a device for supplying power to at least one component of the electronic device 300, and may include, for example, a non-rechargeable primary cell, a rechargeable secondary cell, or a fuel cell. At least a portion of the battery 350 may be, for example, disposed on substantially the same plane as the printed circuit board 340. The battery 350 may be integrally disposed inside the electronic device 300 or may be disposed detachably from the electronic device 300.

In one embodiment, the energy harvesting structure 370 may be disposed beneath the display 330 when facing the first surface from above the first cover 320, and be configured to harvest electrical energy (e.g., energy generated by a current (an amount of charge flowing per unit time)) from a sound generated outside or inside (e.g., the sound output device 155) the electronic device 300 and/or in contact with the first surface. The charging circuit (e.g., the charging circuit 210 of FIG. 2) may be mounted in, for example, the printed circuit board 340 and be configured to charge the battery 350 using electric energy harvested by the energy harvesting structure 370. In another embodiment, the energy harvesting structure 370 may be configured with the display 330 as one module.

Figure 4:
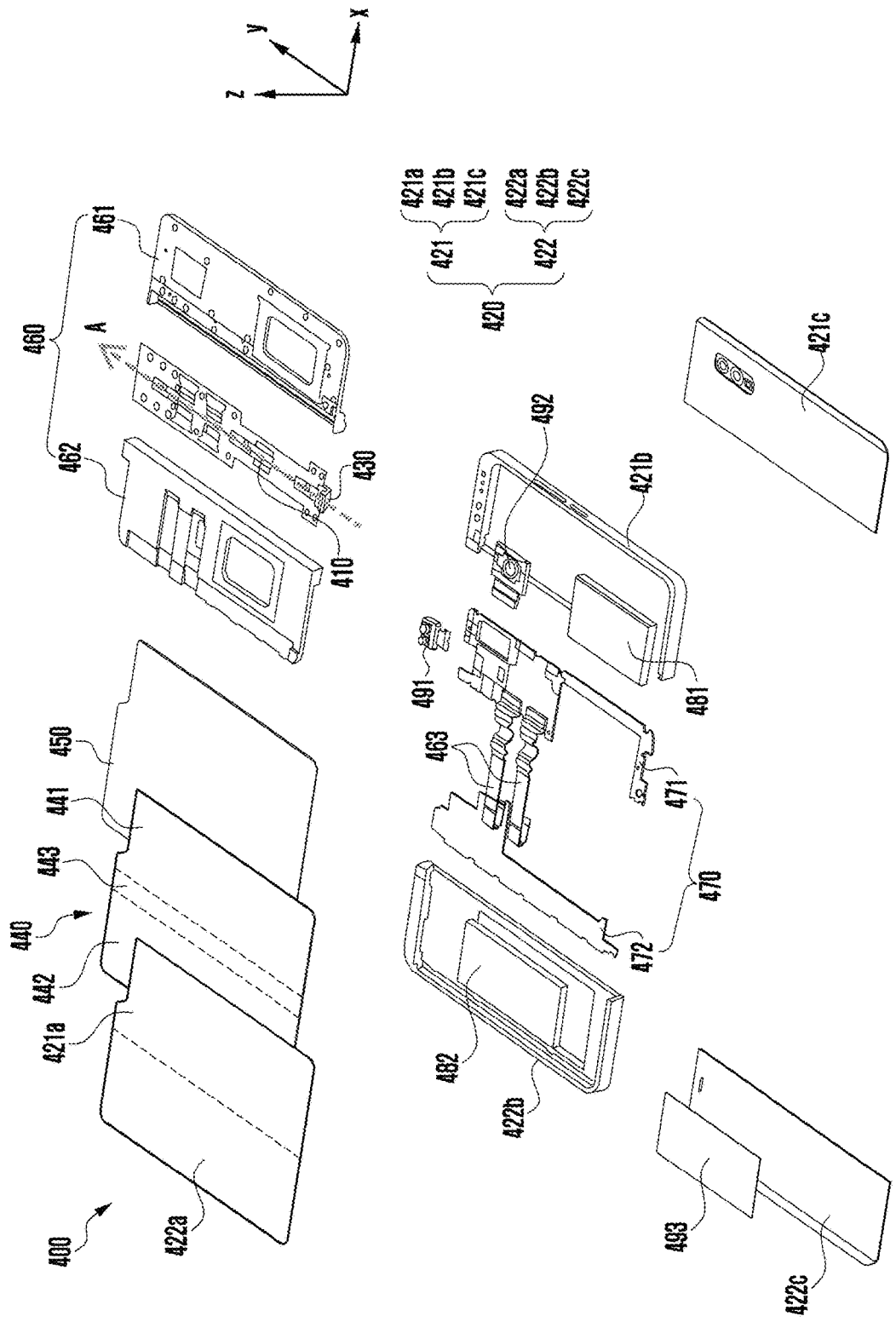
FIG. 4 illustrates an exploded perspective view of an electronic device according to an embodiment.

FIG. 4 illustrates an exploded perspective view of an electronic device 400 according to an embodiment. With reference to FIG. 4, in an embodiment, the electronic device 400 (e.g., the electronic device 101 of FIG. 1) may include a hinge structure 410, a pair of housing structures 420 (e.g., foldable housing structure) rotatably coupled through the hinge structure 410, a hinge cover 430 for covering a foldable portion of the housing structure 420, a display 440 (e.g., flexible display, foldable display, or first display) disposed in a space formed by the housing structure 420, an energy harvesting structure 450, a support member assembly 460, a printed circuit board 470, a first battery 481, and a second battery 482. In the disclosure, a surface in which the display 440 is disposed may be defined as the first surface (or front surface) of the electronic device 400, and an opposite surface of the first surface may be defined as a second surface (or rear surface) of the electronic device 400. Further, a surface enclosing a space between the front surface and the rear surface may be defined as a side surface of the electronic device 400.

In one embodiment, the housing structure 420 may include a first housing structure 421 and a second housing structure 422. The first housing structure 421 may include a first front cover 421a, first side bezel structure 421b, and first rear cover 421c. The second housing structure 422 may include a second front cover 422a, second side bezel structure 422b, and second rear cover 422c. The first front cover 421a and the second front cover 422a may be integrally formed. For example, the integral front covers 421a and 422a may be made of a flexible and transparent material (e.g., colorless polyimide (CPI)). The housing structure 420 is not limited to a shape and coupling illustrated in FIG. 4, and may be implemented by a combination and/or coupling of other shapes or components. For example, the first side bezel structure 421b and the first rear cover 421c may be integrally formed, and the second side bezel structure 422b and the second rear cover 422c may be integrally formed.

In one embodiment, the first housing structure 421 and the second housing structure 422 may be disposed at both sides about a folding axis (axis A), and have a shape that is entirely symmetric with respect to the folding axis (axis A). According to an embodiment, in the first housing structure 421 and the second housing structure 422, an angle or distance formed from each other may vary according to whether the electronic device 400 is in an opened mode or an unfolding state, a closed mode or a folding state, or an intermediate state. In the unfolding state, the first front cover 421a and the second front cover 422a may face in the same first direction, and the first rear cover 421c and the second rear cover 422c may be also opposite to the first direction and face in the same second direction. In the folding state, the first front cover 421a and the second front cover 422a may face each other.

In one embodiment, the energy harvesting structure 450 may be configured to be disposed beneath the display 440 when facing the first surface in an unfolding state and to harvest electrical energy from a sound generated inside or outside the electronic device 400 or and/or in contact with the first surface. The charging circuit (e.g., the charging circuit 210 of FIG. 2) may be configured to be, for example, mounted in the printed circuit board 470 and to charge the first battery 481 and/or the second battery 482 using electric energy harvested by the energy harvesting structure 450. In another embodiment, the energy harvesting structure 450 may be configured with the display 440 as one module.

The support member assembly 460 may include a first support member 461 (e.g., first support plate), a second support member 462 (e.g., second support plate), a hinge structure 410 disposed between the first support member 461 and the second support member 462, a hinge cover 430 for covering the hinge structure 410 when viewing the hinge structure 410 from the outside, and at least one wiring member 463 (e.g., flexible printed circuit board (FPCB)) crossing the first support member 461 and the second support member 462. In one embodiment, the support member assembly 460 may be disposed between the energy harvesting structure 450 and the printed circuit board 470. For example, the first support member 461 may be disposed between a first region 441 of the display 440 and a first printed circuit board 471. The second support member 462 may be disposed between a second region 442 of the display 440 and a second printed circuit board 472.

In an embodiment, at least a portion of the wiring member 463 and the hinge structure 410 may be disposed inside the support member assembly 460. The wiring member 463 may be disposed in a direction crossing the first support member 461 and the second support member 462. For example, the wiring member 463 may be disposed in a direction (e.g., in the X axis direction) perpendicular to a folding axis (e.g., Y axis) of a folding area 443 of the display 440.

In one embodiment, the printed circuit board 470 may include a first printed circuit board 471 disposed at the side of the first support member 461 and a second printed circuit board 472 disposed at the side of the second support member 462. The first printed circuit board 471 and the second printed circuit board 472 may be disposed in a space formed inside the housing structure 420. Components for implementing various functions of the electronic device 400 may be mounted in the first printed circuit board 471 and the second printed circuit board 472.

In one embodiment, in a first space of the first housing structure 421, the first printed circuit board 471, the first battery 481, a sensor module 491 (e.g., the sensor module 176 of FIG. 1), or a camera module 492 (e.g., the camera module 180 of FIG. 1) may be disposed. In a second space of the second housing structure 422, a second printed circuit board 472 and the second battery 482 may be disposed. In the second space of the second housing structure 422, a sub-display 493 (or second display) may be disposed. The sub-display 493 may be disposed to be visible from the outside through at least a partial area of a second rear cover 422c.

FIGS. 5A, 5B, 5C, and 5D illustrate cross-sectional views of an energy harvesting element 500 according to an embodiment.

Figure 5A:
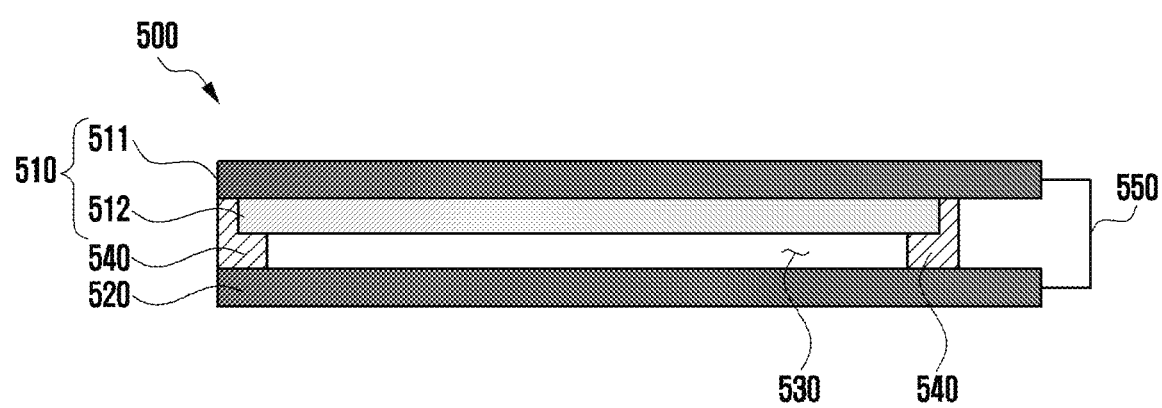
FIGS. 5A, 5B, 5C, and 5D illustrate cross-sectional views of an energy harvesting device according to an embodiment.

With reference to FIG. 5A, the energy harvesting element 500 (e.g., the energy harvesting structure 370 of FIG. 3 or the energy harvesting structure 450 of FIG. 4) may include a vibration membrane (or first electrode) 510, an electrode (or second electrode) 520, and a spacer 540 for forming a space 530 between the vibration membrane 510 and the electrode 520. The spacer 540 may be made of an insulating material (e.g., rubber or plastic). The spacer 540 may further include an adhesive binder to be attached to the vibration membrane 510 and the electrode 520.

The vibration membrane 510 may include a positive charge charging member 511 and a negative charge charging member 512. When facing the front surface (e.g., the front surface of the electronic device 300 of FIG. 3 or the front surface of the electronic device 400 of FIG. 4) in which the display of the electronic device is disposed, the vibration membrane 510 may be positioned under the display (e.g., attached to the display through a separate spacer so as to have a space for vibration), and the electrode 520 may be positioned under the vibration membrane 510. The negative charge charging member 512 may be disposed between the positive charge charging member 511 and the electrode 520.

The positive charge charging member 511 may be made of a metal material (e.g., aluminum, copper) having high conductivity and easy to be charged with a positive charge in the order of electrification. The negative charge charging member 512 may be made of a polymer material (e.g., polyvinylidene fluoride (PVDF), polydimethylsiloxane (PDMS), or polytetrafluoroethylene (PTFE)) that is relatively easier to be charged with a negative charge than the positive charge charging member 511 in the order of electrification and may be attached to the positive charge charging member 511.

The vibration membrane 510 may be spatially separated from the electrode 520 through the spacer 540. The positive charge charging member 511 and the electrode 520 may be electrically connected to a charging circuit 550.

In various embodiments, the positive charge charging member 511 may be referred to as a first positive charge charging member, and the electrode 520 may be referred to as a second positive charge charging member.

When an external force (e.g., sound input and/or contact input) is transferred to the vibration membrane 510, the vibration membrane 510 vibrates up and down; thus, a current may be generated to be transferred to the charging circuit 550. The charging circuit 550 (e.g., the charging circuit 210 of FIG. 2) may charge a battery (e.g., the battery 189 of FIG. 2) using the generated current. The current generation mechanism is as follows.

Figure 5B:
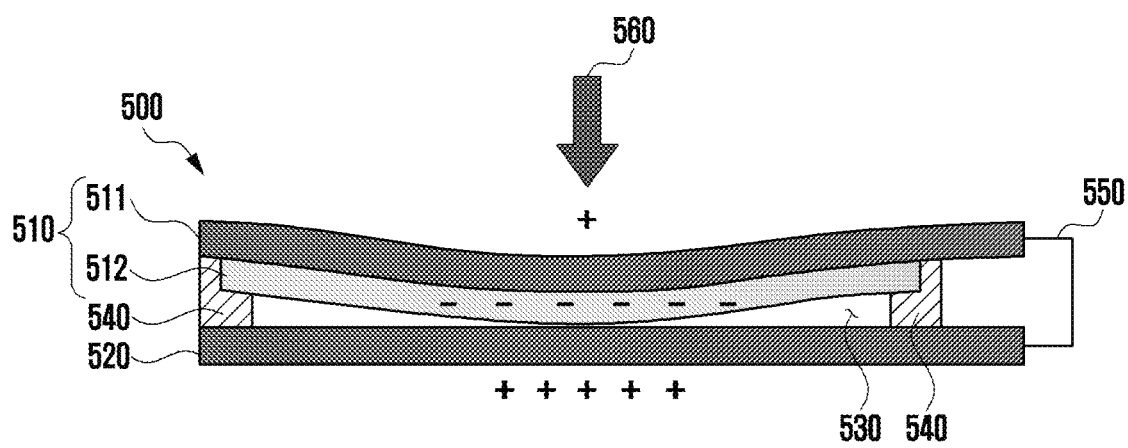

With reference to FIG. 5B, when the vibration membrane 510 contacts or rubs against the second positive charge charging member 520 by an external force 560, the negative charge charging member 512 of the vibration membrane 510 may be charged with a negative charge, and the second positive charge charging member 520 may be charged with a positive charge. This process is caused by contact/triboelectrification, and electrons move to the negative charge charging member 512 through a portion where the second positive charge charging member 520 and the negative charge charging member 512 contact; thus, the negative charge charging member 512 and the first positive charge charging member 511 have a negative charge or a positive charge, respectively.

Figure 5C:
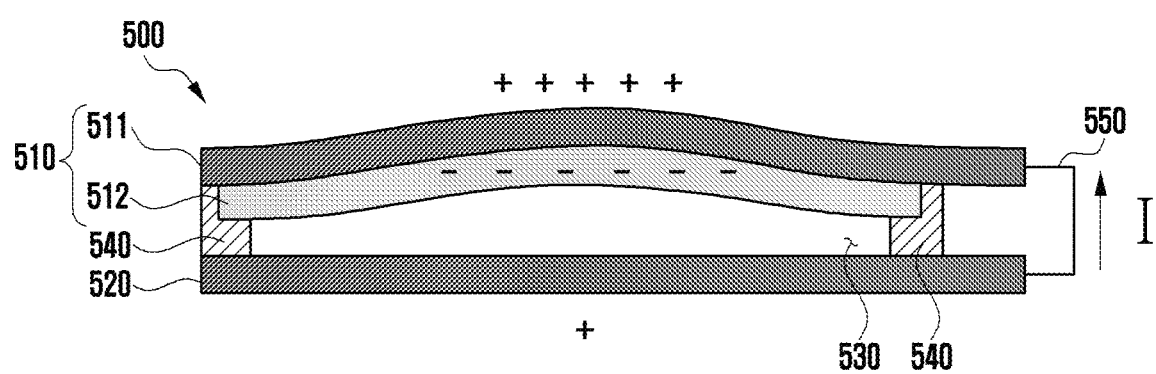

With reference to FIG. 5C, when the vibration membrane 510 moves away from the second positive charge charging member 520, a contact area between the vibration membrane 510 and the second positive charge charging member 520 is reduced and/or a potential of the positive charge charging member 511 connected to the second positive charge charging member 520 through the charging circuit 550 is relatively low; thus, positive charges harvested in the second positive charge charging member 520 are moved to the first positive charge charging member 511 through the charging circuit 550. Accordingly, a current advancing to the first positive charge charging member 511 may be applied to the charging circuit 550.

Figure 5D:
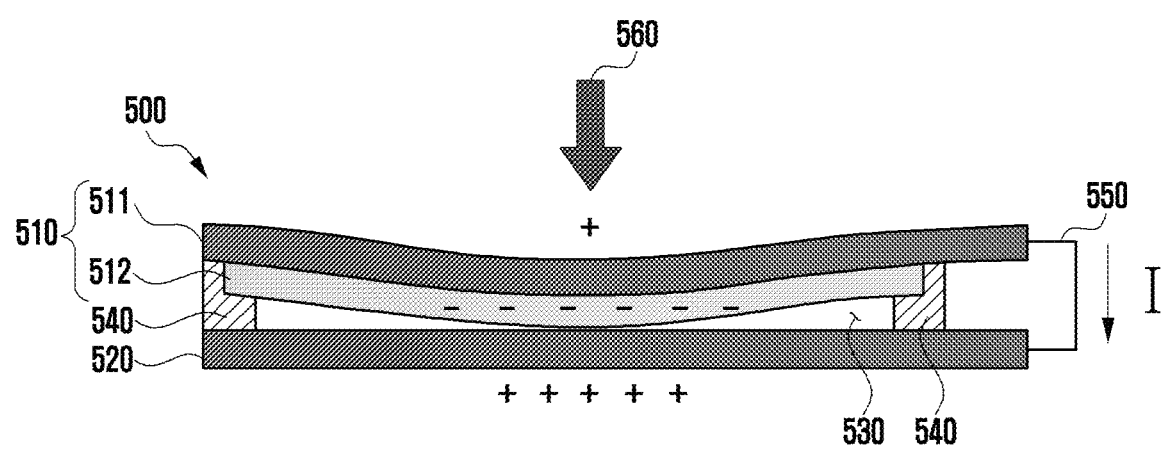

With reference to FIG. 5D, when the vibration membrane 510 again approaches/contacts the second positive charge charging member 520, the contact area is increased and/or a potential of the second positive charge charging member 520 connected to the positive charge charging member 511 through the external circuit 550 is relatively low; thus, the excess positive charge in the positive charge charging member 511 moves back to the second positive charge charging member 520 through the charging circuit 550. Accordingly, a current in an opposite direction (advancing to the second positive charge charging member 520) may be applied to the charging circuit 550. When the contact input and the sound input are continued, the energy harvesting element 500 may generate an AC current by repeating the states of FIGS. 5C and 5D.

Figure 6A:
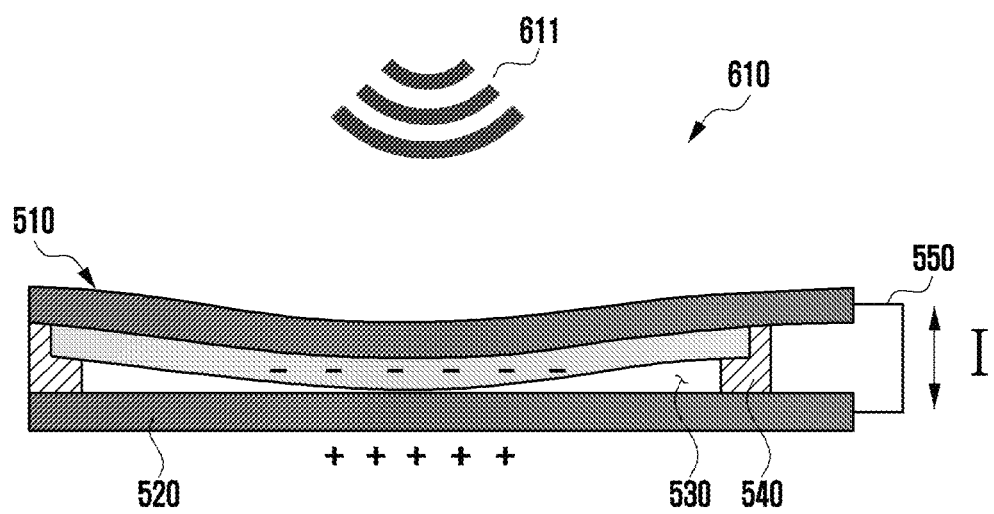
FIG. 6A illustrates a diagram of a vibration state of a vibrating membrane of FIG. 5 when a sound input is applied.
Figure 6B:
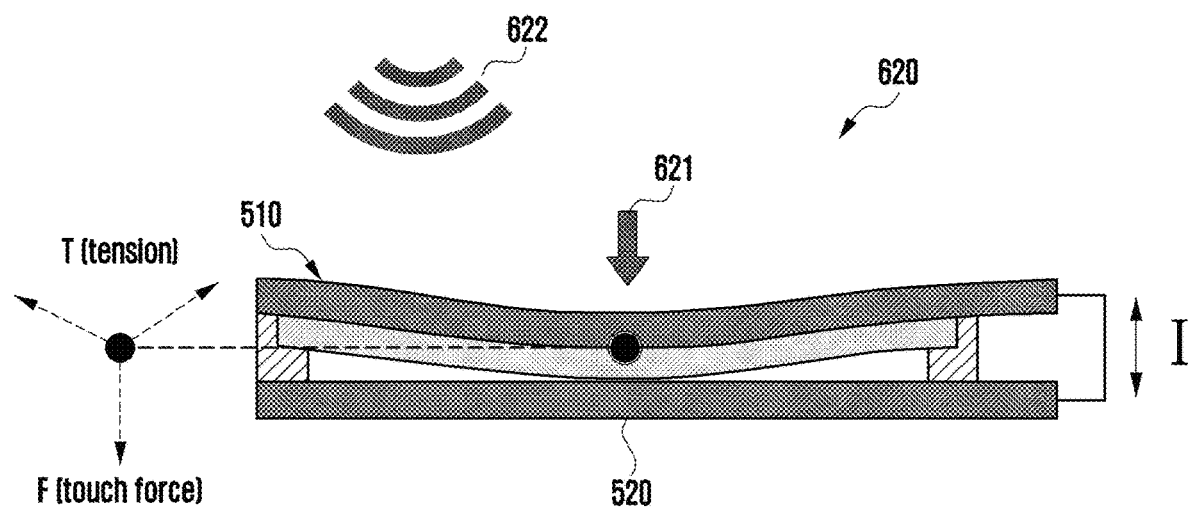
FIG. 6B illustrates a diagram of a vibrating state of the vibrating membrane of FIG. 5 when a sound input and a contact input are simultaneously applied.

FIG. 6A illustrates a diagram 610 illustrating a vibration state of the vibration membrane 510 when a sound input is applied, and FIG. 6B illustrates a diagram 620 of a vibrating state of the vibration membrane 510 when a sound input and a contact input are simultaneously applied.

With reference to FIG. 6A, a sound input 611 is transferred to the vibration membrane 510; thus, the vibration membrane 510 vibrates up and down, thereby generating an AC current.

With reference to FIG. 6B, a pressure (e.g., touch force) of a contact input 621 may be transferred to the vibration membrane 510. Tension may be generated as a reaction to the contact input 621 and be spread to the entire vibration membrane 510. Because the contact input 621 is not released, while the tension is maintained, when a sound input 622 is transferred to the vibration membrane 510, an amplitude of a vibration of the vibration membrane 510 may be reduced compared with the state of FIG. 6A because of the tension. The decrease in amplitude may cause a decrease in positive charge movement between the vibration membrane 510 and the electrode 520. Accordingly, as the current decreases, an energy harvesting ability of the sound input 622 may be lowered compared to when only the sound input 622 is applied to the vibration membrane 510 without the contact input 621.

Figure 7A:
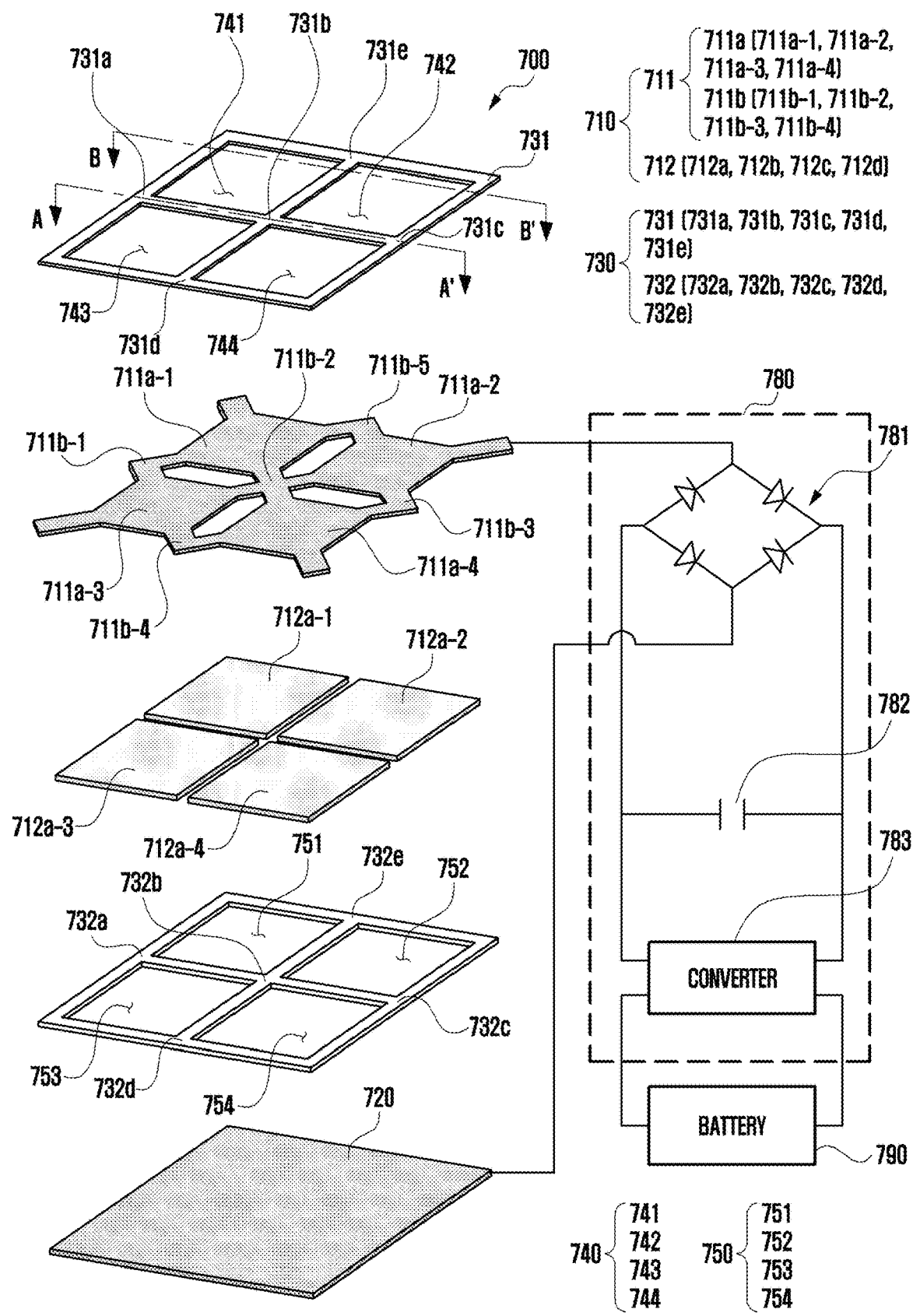
FIG. 7A illustrates an exploded perspective view of a latticed energy harvesting structure and a block diagram of a charging circuit according to various embodiments.
Figure 7B:
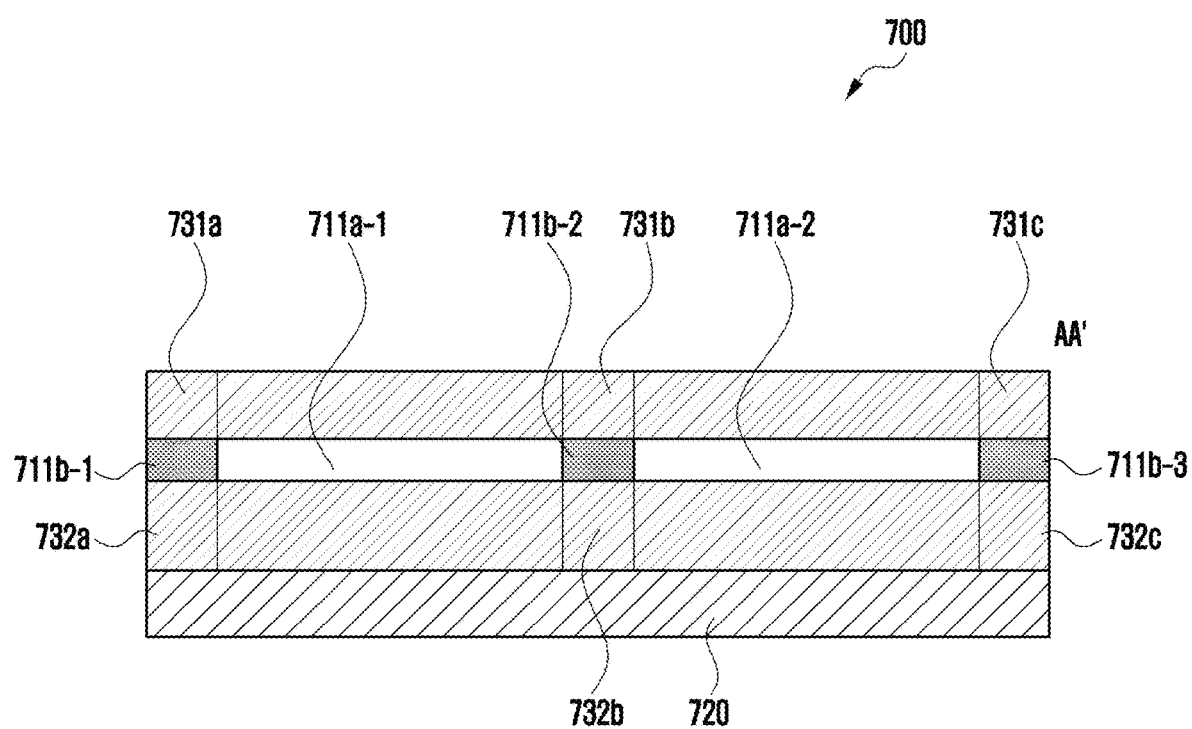
FIG. 7B illustrates a cross-sectional view taken in a direction AA' in a state in which an energy harvesting structure is coupled.
Figure 7C:
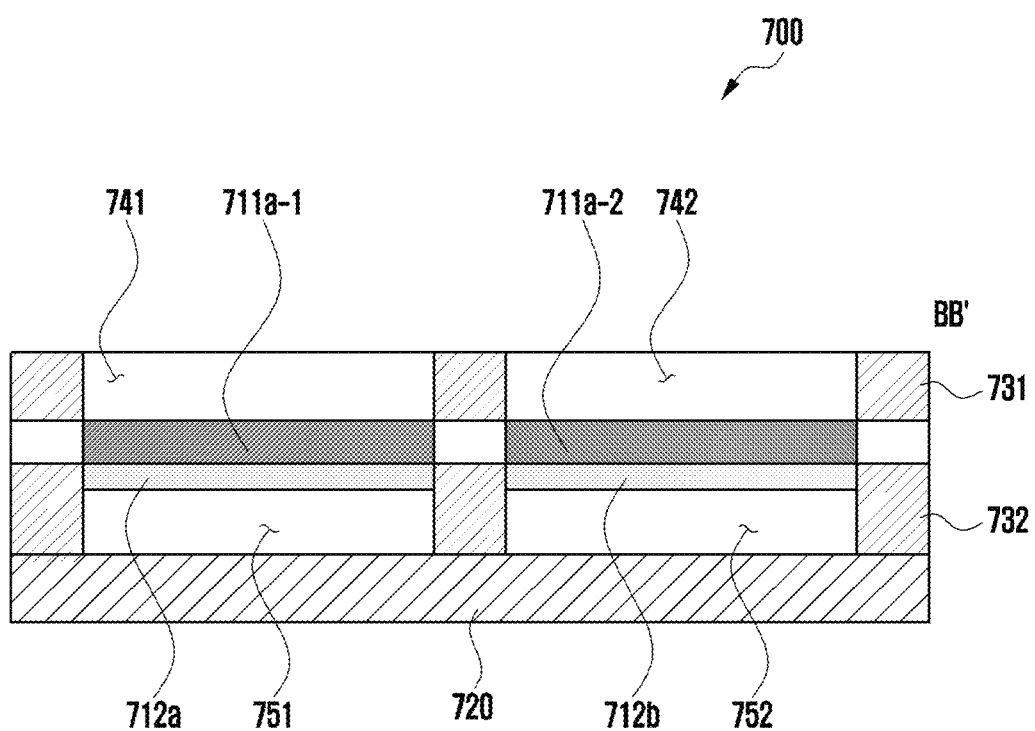
FIG. 7C illustrates a cross-sectional view taken in a direction BB' in a state in which the energy harvesting structure is coupled.
Figure 7D:
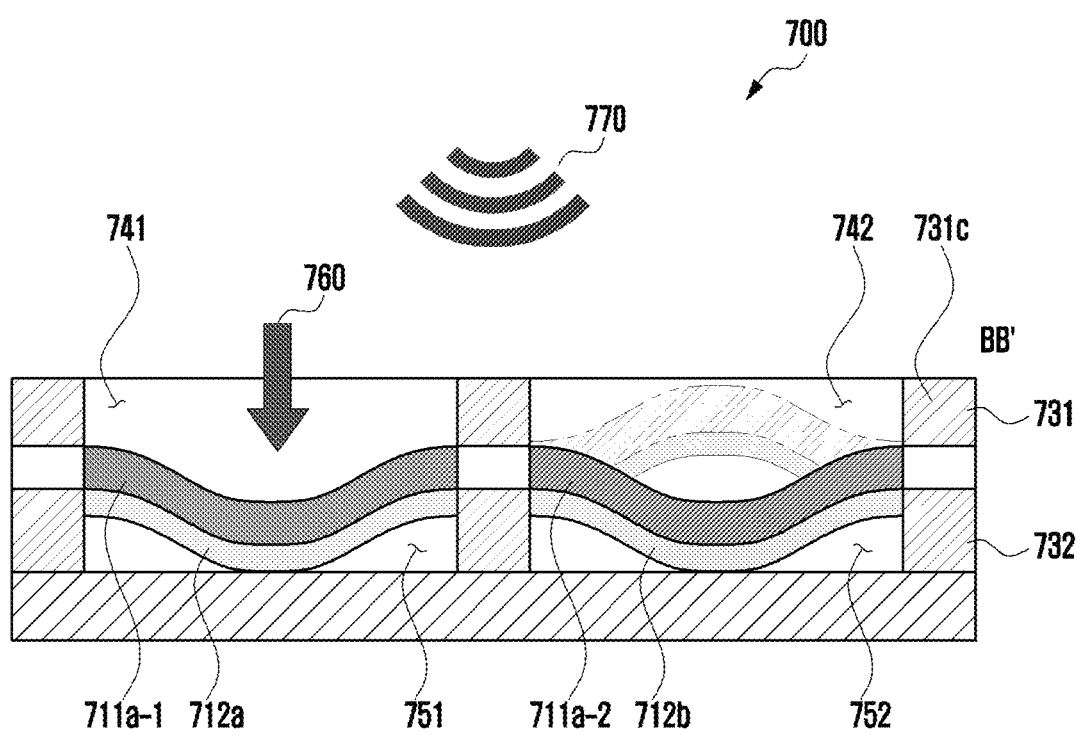
FIG. 7D illustrates a diagram of a vibration state of a vibrating membrane when a sound input and a contact input are simultaneously applied.

FIG. 7A illustrates an exploded perspective view of a latticed energy harvesting structure 700 and a block diagram of a charging circuit 780 according to various embodiments, FIG. 7B illustrates a cross-sectional view taken in a direction AA' in a state in which the energy harvesting structure 700 is coupled, FIG. 7C illustrates a cross-sectional view taken in a direction BB' in a state in which the energy harvesting structure 700 is coupled, and FIG. 7D illustrates a diagram of a vibration state of a vibration membrane 710 when a sound input and a contact input are simultaneously applied. For convenience of description, components repeated with FIG. 5 will be omitted or briefly described.

With reference to FIGS. 7A, 7B, and 7C, the energy harvesting structure 700 (e.g., the energy harvesting structure 370 of FIG. 3 or the energy harvesting structure 450 of FIG. 4) may be an energy harvesting module in which a plurality of energy harvesting elements is configured in a lattice form. The energy harvesting structure 700 may include a vibration membrane (or first electrode) 710 including a first positive charge charging member 711 and a negative charge charging member 712, a second positive charge charging member (or second electrode) 720, and a spacer 730.

The first positive charge charging member 711 may include a plurality of positive charge lattices (or positive charge cells) 711a regularly arranged in a designated shape (e.g., square) and a plurality of connection portions 711b connecting adjacent positive charge lattices. The connection portions 711b may be geometrically shaped like a bottleneck.

The negative charge charging member 712 may include a plurality of negative charge lattices (or negative charge cells) 712a, 712b, 712c, and 712d arranged in the same manner as the positive charge lattices 711a with a designated shape (e.g., the same shape as the positive charge lattice). The negative charge lattices 712a, 712b, 712c, and 712d may be interposed between the first positive charge charging member 711 and the second positive charge charging member 720, and be attached to the positive charge lattices 711a, respectively.

The spacer 730 may include a first spacer 731 positioned on the first positive charge charging member 711 and a second spacer 732 positioned beneath the first positive charge charging member 711.

The first spacers 731 may include first fixing portions 731a, 731b, 731c, 731d and 731e attached to upper portions of the connection portions 711b to fix the connection portions 711b when the positive charge lattices 711a vibrate. For example, as illustrated in FIG. 7B, upper portions of the connection portions 711b-1, 711b-2, and 711b-3 may be attached to first fixing portions 731a, 731b, and 731c. The first spacer 731 may form latticed first spaces (or upper spaces) 740 for enabling the positive charge lattices 711a to move upward. For example, as illustrated in FIG. 7C, the first spaces 741, 742, 743, and 744 in which the positive charge lattices 711a-1 and 711a-2 may move upward may be formed inside the first spacers 731.

The second spacer 732 may include second fixing portions 732a, 732b, 732c, 732d, and 732e attached to lower portions of the connection portions 711b to fix the connection portions 711b when the positive charge lattices 711a vibrate. For example, as illustrated in FIG. 7B, the lower portions of the connection portions 711b-1, 711b-2, and 711b-3 may be attached to the second fixing portions 732a, 732b, and 732c. The second spacer 732 may form latticed second spaces (or lower spaces) 750 for enabling the positive charge lattices 711a to move downward. For example, as illustrated in FIG. 7C, second spaces 751, 752, 753, and 754 in which the positive charge lattices 711a-1 and 711a-2 may move downward may be formed inside the second spacer 732.

The first positive charge charging member 711 and the second positive charge charging member 720 may be connected to the charging circuit 780. When an external force (e.g., sound input and/or contact input) is applied to the vibration membrane 710, the vibration membrane 710 may vibrate up and down; thus, an alternating current may be applied to the charging circuit 780. The charging circuit 780 (e.g., the charging circuit 210 of FIG. 2) may charge a battery 790 (e.g., the battery 189 of FIG. 2) using the applied AC current. In one embodiment, the charging circuit 780 may include a rectifier 781 for converting the flow of charge input from the energy harvesting structure 700 from AC to DC, a capacitor 782 for charging electric charges input from the energy harvesting structure 700 through the rectifier 781, and a converter 783 for converting a voltage of electric charges discharged from the capacitor 782 into a specified voltage to charge the battery 790.

As described above, the vibration membrane 710 may be subdivided into a lattice (or cell) unit, and each of the lattices may independently vibrate by the spacers 730. When describing with reference to FIG. 7D, tension is generated in the positive charge lattice 711a-1 as a reaction to a contact input 760, but as the connection portions 711b are fixed to the spacer 730, the tension may not be propagated to another positive charge lattice 711a-2. Accordingly, the other positive charge lattice 711a-2 may vibrate by a sound input 770 without the effect of tension. As a result, the energy harvesting structure 700 may harvest electrical energy from the sound input and transfer the electrical energy to the charging circuit 780 even while the contact input is transferred to the vibration membrane 710.

In various embodiments, the energy harvesting structure 700 of FIG. 7 may support measurement of ambient noise. For example, the energy harvesting structure 700 may be operatively connected to a processor (e.g., the processor 120 of FIG. 1). The processor may obtain electrical energy generated according to a vibration of the vibration membrane 710 from the energy harvesting structure 700, measure the intensity of ambient noise based on the obtained electrical energy, and provide the measured intensity value (e.g., decibels (dB)) to the user through the display.

Figure 8:
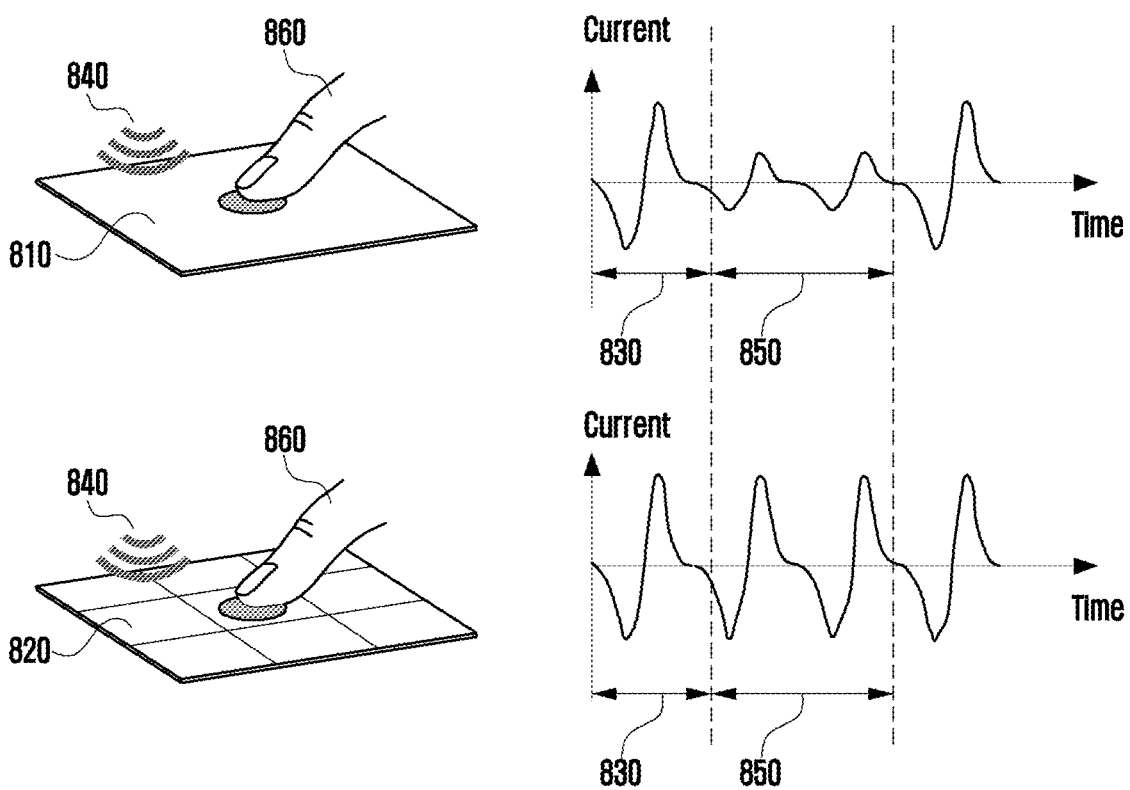
FIG. 8 illustrates a diagram of a difference in energy harvesting between a latticed energy harvesting structure and a non-latticed energy harvesting structure.

FIG. 8 illustrates a diagram of a difference in energy harvesting between a latticed energy harvesting structure and a non-latticed energy harvesting structure. With reference to FIG. 8, a first energy harvesting structure 810 may be, for example, the energy harvesting element 500 of FIG. 5 that is not latticed. A second energy harvesting structure 820 may be, for example, the energy harvesting structure 700 of FIG. 7 that is latticed.

In a first time period 830, a sound input 840 may be transferred to a vibration membrane of the energy harvesting structures 810 and 820. An energy harvesting ability from the sound input 840 of the first energy harvesting structure 810 may be the same as that from the sound input 840 of the second energy harvesting structure 820. For example, electric energy (e.g., energy generated by a current) generated per unit time in the first energy harvesting structure 810 may be the same as that generated per unit time in the second energy harvesting structure 820.

In a second time period 850, the sound input 840 and a contact input 860 may be transferred to the vibration membrane of the energy harvesting structures 810 and 820. In the first energy harvesting structure 810, tension caused by the contact input 860 is spread to the entire vibration membrane; thus, the energy harvesting ability may be lowered. In the second energy harvesting structure 820, the tension may be limited to a lattice(s) to which the contact input 860 is applied and may not propagate to other lattices. Accordingly, the second energy harvesting structure 820 may harvest energy from the sound input 840. For example, assuming that the sound input 840 is maintained at the same intensity and the contact input 860 is maintained without release, electric energy generated by the second energy harvesting structure 820 per unit time in the second time period 850 may be greater than that generated by the first energy harvesting structure 810 per unit time in the second time period 850.

Figure 9:
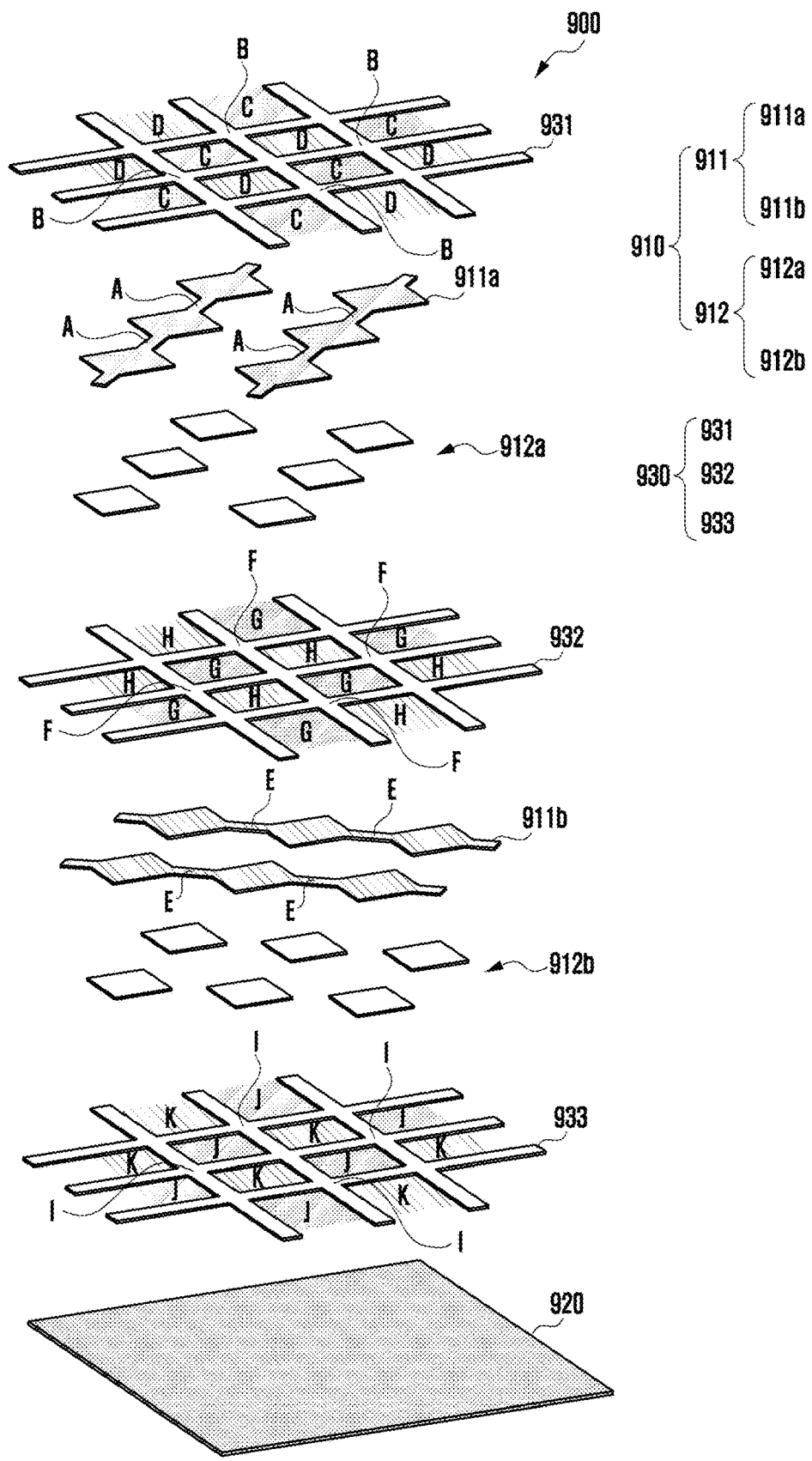
FIG. 9 illustrates an exploded perspective view of an energy harvesting structure having a lattice vibration membrane of a dual layer structure according to various embodiments.

FIG. 9 illustrates an exploded perspective view of an energy harvesting structure 900 having a lattice vibrating membrane of a dual layer structure according to various embodiments. For convenience of description, components repeated with FIG. 7 will be omitted or briefly described.

With reference to FIG. 9, the energy harvesting structure 900 (e.g., the energy harvesting structure 370 of FIG. 3 or the energy harvesting structure 450 of FIG. 4) may include a vibration membrane (or first electrode) 910 including a first positive charge charging member 911 and a negative charge charging member 912, a second positive charge charging member (or second electrode) 920, and a spacer 930.

The first positive charge charging member 911 may include a plurality of first lines (or lower lines) 911a arranged in a third direction (e.g., a direction perpendicular to the first direction or the second direction) in a first layer (or upper layer) and a plurality of second lines (or upper lines) 911b arranged in a fourth direction crossing the third direction in a second layer (or lower layer). The first lines 911a and the second lines 911b may include a plurality of positive charge lattices and a plurality of connection portions connecting adjacent positive charge lattices.

The negative charge charging member 912 may include first negative charge lattices 912a attached to the positive charge lattices of the first lines 911a and second negative charge lattices 912b attached to the positive charge lattices of the second lines 911b.

The spacer 930 may include a first spacer 931 positioned on the first lines 911a, a second spacer 932 interposed between the first lines 911a and the second lines 911b, and a third spacer 933 positioned beneath the second lines 911b.

The first spacer 931 may include fixing portions B attached to upper portions of connection portions A of the first lines 911a to fix the connection portion A of the first lines 911a when the positive charge lattices of the first lines 911a vibrate. The first spacer 931 may form lattice spaces C for enabling positive charge lattices of the first lines 911a to move upward and latticed spaces D for enabling the positive charge lattices of the second lines 911b to move upward.

The second spacer 932 may include fixing portions F attached to the lower portion of the connection portions A of the first lines 911a and the upper portion of connection portions E of the second lines 911b to fix the connecting portions A and E of the lines 911a and 911b when the positive lattices of the lines 911a and 911b vibrate. The second spacer 932 may form lattice spaces G for enabling the positive charge lattices of the first lines 911a to move downward and lattice spaces H for enabling the positive charge lattices of the second lines 911b to move upward.

The third spacer 933 may include fixing portions I attached to lower portions of the connection portions E of the second lines 911b to fix the connection portions E of the second lines 911b when the positive charge lattices of the second lines 911b vibrate. The third spacer 933 may form lattice spaces J for enabling the positive charge lattices of the first lines 911a to move downward and lattice spaces K for enabling the positive charge lattices of the second lines 911b to move downward.

As described above, the vibration membrane 910 may be subdivided into a lattice (or cell) unit, and each lattice may independently vibrate by the spacer 930. For example, as a contact input is transferred to a portion of the lattices, even if tension is generated, such tension may be limited to the portion by the spacer 930. Accordingly, other lattices may vibrate by a sound input without the effect of tension, and as a result, the energy harvesting structure 900 may harvest energy from the sound input to transfer the energy to the charging circuit (e.g., the charging circuit 210 of FIG. 2) even while a contact input is applied to the vibration membrane 910.

In various embodiments, the energy harvesting structure 900 of FIG. 9 may support measurement of ambient noise. The energy harvesting structure 900 of FIG. 9 may support contact recognition with an auxiliary means or instead of a touch circuit embedded in a display (e.g., the display 330 of FIG. 3 or the display 440 of FIG. 4). Specifically, it will be described with reference to FIG. 10.

Figure 10:
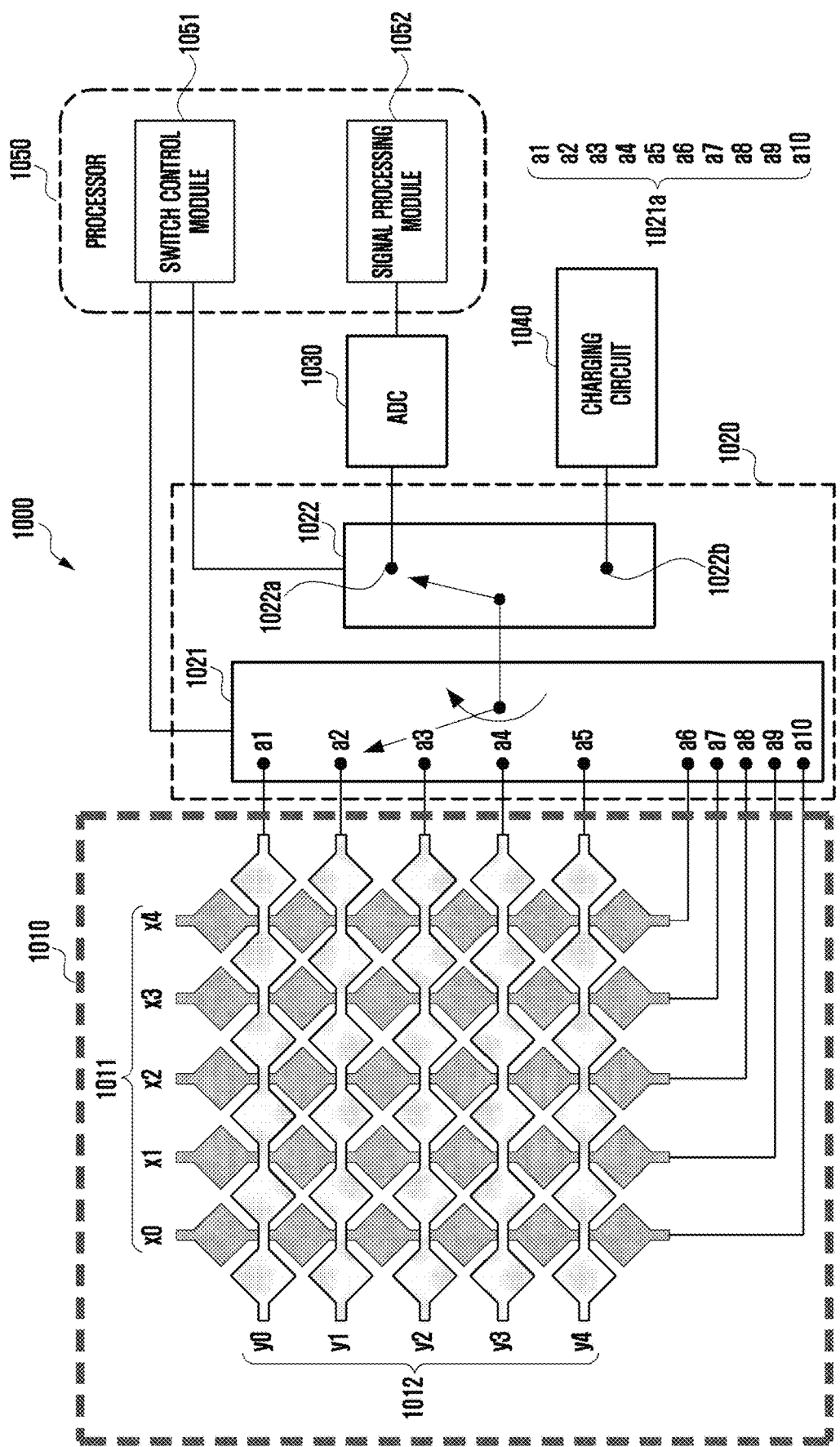
FIG. 10 illustrates a block diagram of an electronic device configured to support energy harvesting, noise measurement, and contact recognition according to various embodiments.

FIG. 10 illustrates a block diagram of an electronic device 1000 configured to support energy harvesting, noise measurement, and contact recognition according to various embodiments. For convenience of description, components repeated with FIGS. 7 and 9 will be omitted or briefly described. With reference to FIG. 10, the electronic device 1000 (e.g., the electronic device 101 of FIG. 1) may include an energy harvesting structure 1010, switch 1020, analog digital converter (ADC) 1030, charging circuit 1040, and processor 1050. It is illustrated that the ADC 1030 is configured as a separate module, but it is not limited thereto and may be a circuit built into the processor 1050.

First positive charge charging members 1011 and 1012 of the energy harvesting structure 1010 (e.g., the energy harvesting structure 900 of FIG. 9) may include X-axis lines (or strips) 1011 (x0, x1, x2, x3, and x4) (e.g., the first lines 911a of FIG. 9) and Y-axis lines 1012 (y0, y1, y2, y3, and y4) (e.g., the second lines 911b of FIG. 9). The lines 1011 and 1012 may be connected to the charging circuit 1040 or the processor 1050 through the switch 1020. Although not illustrated, the second positive charge charging member (e.g., the second positive charge charging member 920 of FIG. 9) of the energy harvesting structure 1010 may be connected to the ADC 1030 and the charging circuit 1040.

The switch 1020 may connect the energy harvesting structure 1010 to the charging circuit 1040 or the processor 1050. For example, the switch 1020 may sequentially connect the lines 1011 and 1012 one by one to the processor 1050 or may connect all of the lines 1011 and 1012 to the charging circuit 1040. In one embodiment, the switch 1020 may include a first switch 1021 and a second switch 1022.

The first switch 1021 may include a plurality of terminals 1021a (a1, a2, a3, a4, a5, a6, a7, a8, a9, and a10) connected to the lines 1011 and 1012, respectively, and selectively connect the terminal 1021a to the second switch 1022. In one embodiment, the first switch 1021 may include a multiplexer. The first switch 1021 may be configured to sequentially connect the terminals 1021a one by one to the second switch 1022 or to connect all of the terminals 1021a to the second switch 1022 based on the control of the processor 1050. Accordingly, electrical signals (e.g., a current that changes with time as illustrated in FIG. 8) (Sx0, Sx1, Sx2, Sx3, Sx4, Sy0, Sy1, Sy2, Sy3, and Sy4) generated in each line may be sequentially transferred to the second switch 1022 through the first switch 1021 or the electrical signals may be combined into one electrical signal to be transferred to the second switch 1022.

The second switch 1022 may include a first terminal 1022a connected to the ADC 1030 and a second terminal 1022b connected to the charging circuit 1040 (e.g., the charging circuit 780 of FIG. 7), and connect the first switch 1021 to the first terminal 1022a or the second terminal 1022b. In one embodiment, the second switch 1022 may include a demultiplexer.

The processor 1050 may control the switches 1021 and 1022 to configure the electronic device 1000 in a signal processing (e.g., noise measurement and/or contact recognition) mode or a charging mode. In one embodiment, the processor 1050 (e.g., the processor 120 of FIG. 1) may include a switch control module 1051 and a signal processing module 1052.

The switch control module 1051 may determine an operation mode of the electronic device 1000 as a signal processing mode or a charging mode. For example, the switch control module 1051 may determine an operation mode as a signal processing mode (e.g., noise measurement mode) based on execution of a noise measurement application. The switch control module 1051 may determine the operation mode as the charging mode based on the end of execution of the noise detection application. As another example, the switch control module 1051 may determine the operation mode as the signal processing mode (e.g., contact recognition mode) based on that contact recognition using the energy harvesting structure 1010 is set to active. The switch control module 1051 may determine the operation mode as the charging mode based on that the contact recognition is set to inactive. As another example, the switch control module 1051 may determine the operation mode as the charging mode based on execution of a game application. As another example, the switch control module 1051 may determine the operation mode as the charging mode based on execution of a function (e.g., drawing) using a digital pen.

The switch control module 1051 may control the switches 1021 and 1022 to connect all of the lines 1011 and 1012 to the charging circuit 1040 in the charging mode. For example, the switch control module 1051 may perform an operation of controlling the first switch 1021 to connect all of the terminals 1021a to the second switch 1022 and an operation of controlling the second switch 1022 to connect the first switch 1021 to the charging circuit 1040 through the second terminal 1022b.

The switch control module 1051 may control the switches 1021 and 1022 to sequentially connect the lines 1011 and 1012 one by one to the ADC 1030 in the signal processing mode (contact recognition mode or noise measurement mode). For example, the switch control module 1051 may perform an operation of controlling the first switch 1021 to sequentially connect the terminals 1021a one by one to the second switch 1022 and an operation of controlling the second switch 1022 to connect the first switch 1021 to the ADC 1030 through the first terminal 1022a.

In the contact recognition mode, the signal processing module 1052 may recognize a contact position based on electrical signals sequentially received one by one from the ADC 1030. For example, the signal processing module 1052 may sequentially receive one by one electrical signals Sx0, Sx1, Sx2, Sx3, Sx4, Sy0, Sy1, Sy2, Sy3, and Sy4 converted from analog to digital by the ADC 1030 from the ADC 1030. The signal processing module 1052 may recognize an x-axis line and a y-axis line in which a flow (current) of electric charges is generated from the received electric signals or in which a change amount per unit time of a current exceeding a specified reference value has occurred and determine an intersection of two lines as a contact location (e.g., touch coordinates (x, y)).

In the noise measurement mode, the signal processing module 1052 may measure the intensity of ambient noise based on electrical signals sequentially received one by one through the ADC 1030. For example, the memory (e.g., the memory 130 of FIG. 1) of the electronic device 1000 may store a table including current values generated in each of the lines 1011 and 1012 according to the intensity of noise (sound) and/or a noise measurement function (f(current)) that outputs an intensity value as a result of an input (current value). The signal processing module 1052 may calculate current values Ix0, Ix1, Ix2, Ix3, Ix4, Iy0, Iy1, Iy2, Iy3, and Iy4 generated in each line, calculate intensity values of noise matching to the current values using the table or the noise measurement function, and determine an average of the intensity values as the intensity of the ambient noise.

The signal processing module 1052 may accurately measure the intensity of ambient noise even in a situation in which a contact occurs by excluding a current value generated in a line to which a contact input is transferred from noise measurement. For example, the signal processing module 1052 may determine a current value less than or equal to a specified first reference value among current values as a current value generated in a line in which a contact input is maintained without release, and determine a current value exceeding the first reference value as a current value generated in a line to which no contact input is transferred. The signal processing module 1052 may exclude a current value less than or equal to the first reference value when calculating the average. As another example, the signal processing module 1052 may calculate an amount of change per unit time of a current generated in each line, determine an amount of change exceeding a specified second reference value among amounts of change to a change amount generated in a line to which the contact input is instantaneously applied, and determine an amount of change less than or equal to the second reference value as an amount of change generated in a line to which the contact input is not transferred. The signal processing module 1052 may exclude a current value generated in a line to which the contact input is transferred, when calculating the average.

In the noise measurement mode, the signal processing module 1052 may recognize a situation that a contact occurs as described above; thus, in order to increase the accuracy of noise measurement, the signal processing module 1052 may output a message requesting interruption of contact through the display and/or the sound output device.

Figure 11:
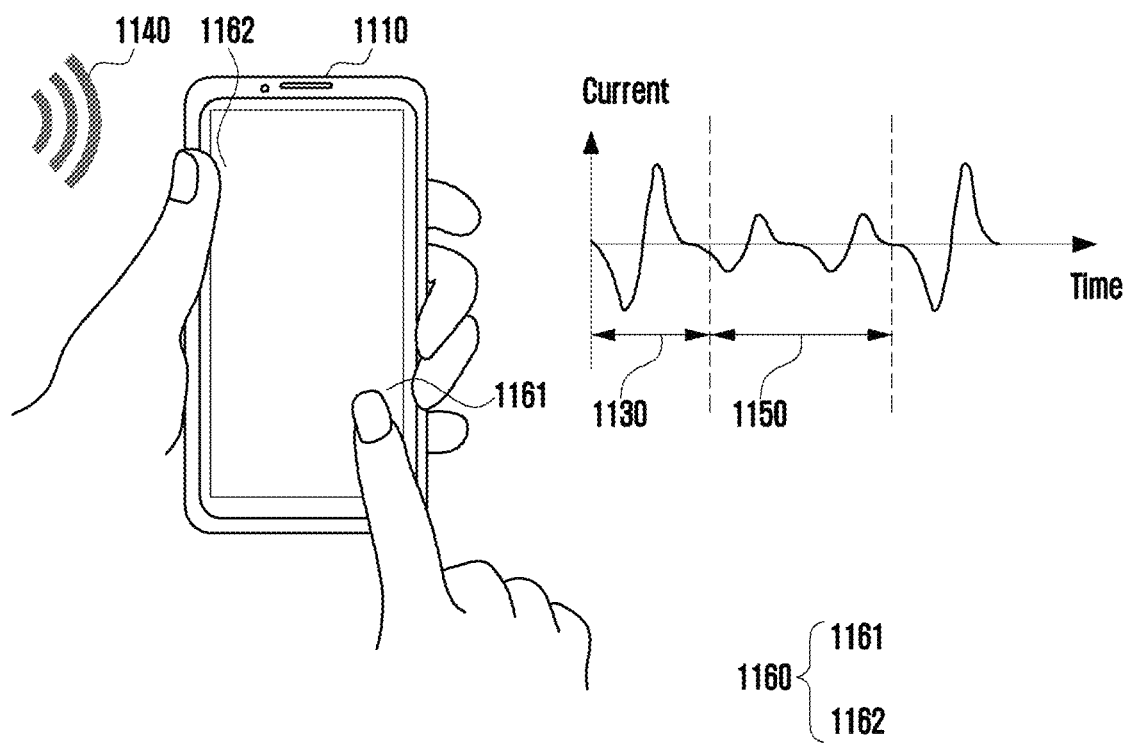
FIG. 11 illustrates a diagram of a difference in energy harvesting between a mobile electronic device having a latticed energy harvesting structure and a mobile electronic device having a non-latticed energy harvesting structure during a hand touch input.
Figure 11:
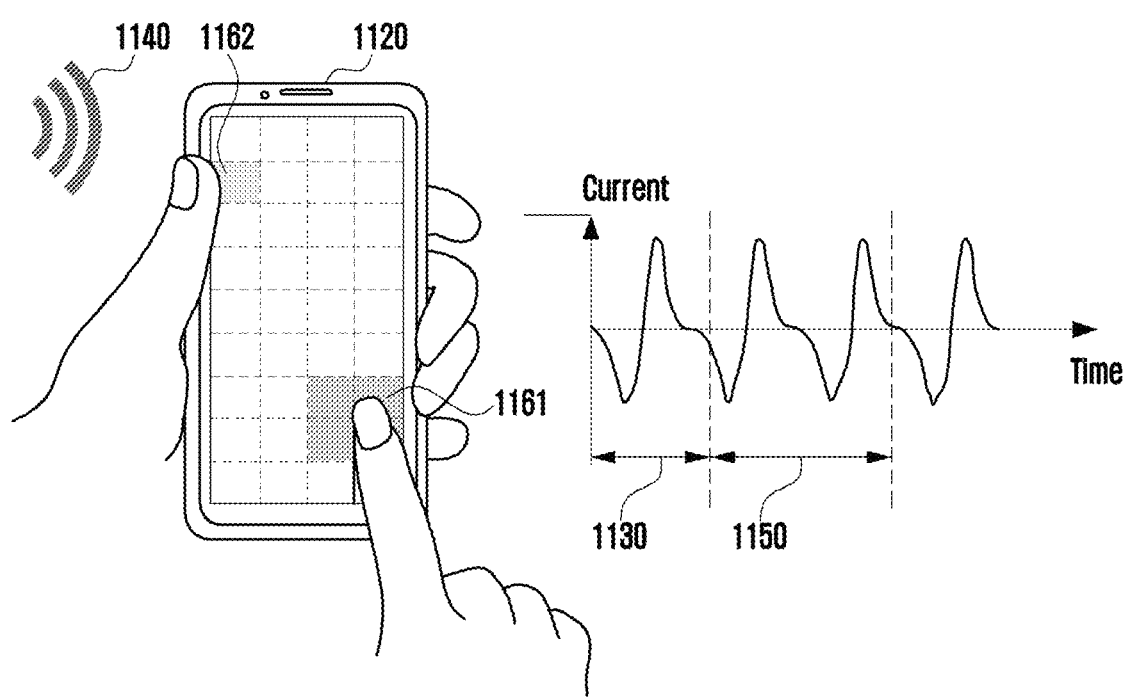

FIG. 11 illustrates a diagram of a difference in energy harvesting between a mobile electronic device having a latticed energy harvesting structure and a mobile electronic device having a non-latticed energy harvesting structure during a hand touch input. With reference to FIG. 11, a first mobile electronic device 1110 may include a non-latticed energy harvesting structure (e.g., the energy harvesting element 500 of FIG. 5). A second mobile electronic device 1120 may include a latticed energy harvesting structure (e.g., the energy harvesting structure 700 of FIG. 7 or the energy harvesting structure 900 of FIG. 9).

The first mobile electronic device 1110 and the second mobile electronic device 1120 may harvest the same amount of energy from a sound input 1140 in a first time period 1130. In a second time period 1150, the sound input 1140 may be maintained, and a hand touch input 1160 may be transferred to the vibration membrane through the front cover (e.g., glass) and the display of the devices 1110 and 1120. Here, the hand touch input 1160 may include a user's intended touch gesture 1161 and/or unintended operation, for example, a holding operation 1162 for holding the device. In the first mobile electronic device 1110, tension caused by the hand touch input 1160 may be propagated to the entire vibration membrane. In the second mobile electronic device 1120, tension caused by the hand touch input 1160 may be limited to the lattice(s) to which the hand touch input 1160 is applied and may not propagate to other lattices. Accordingly, the second mobile electronic device 1120 may harvest electric energy more than the first mobile electronic device 1110.

In the case of a contact input performed using a stylus pen, because of the characteristics of the pen, an external force such as a drawing motion or a writing input motion may be continuously transferred to the vibration membrane. In general, because a pen tip has a small area and high hardness compared to a finger, a relatively greater pressure is transferred to the vibrating membrane. Accordingly, the probability of occurrence of a narrow disposition and/or excessive tension between the vibrating membrane and the electrode positioned under the vibrating membrane may increase. According to various embodiments, the vibrating membrane may be subdivided into a lattice unit, and each lattice may independently vibrate by the spacer. Thus, even while a pen touch input is given, other lattices other than the lattice(s) to which the pen touch input is transferred may harvest electrical energy from the sound input.

Figure 12:
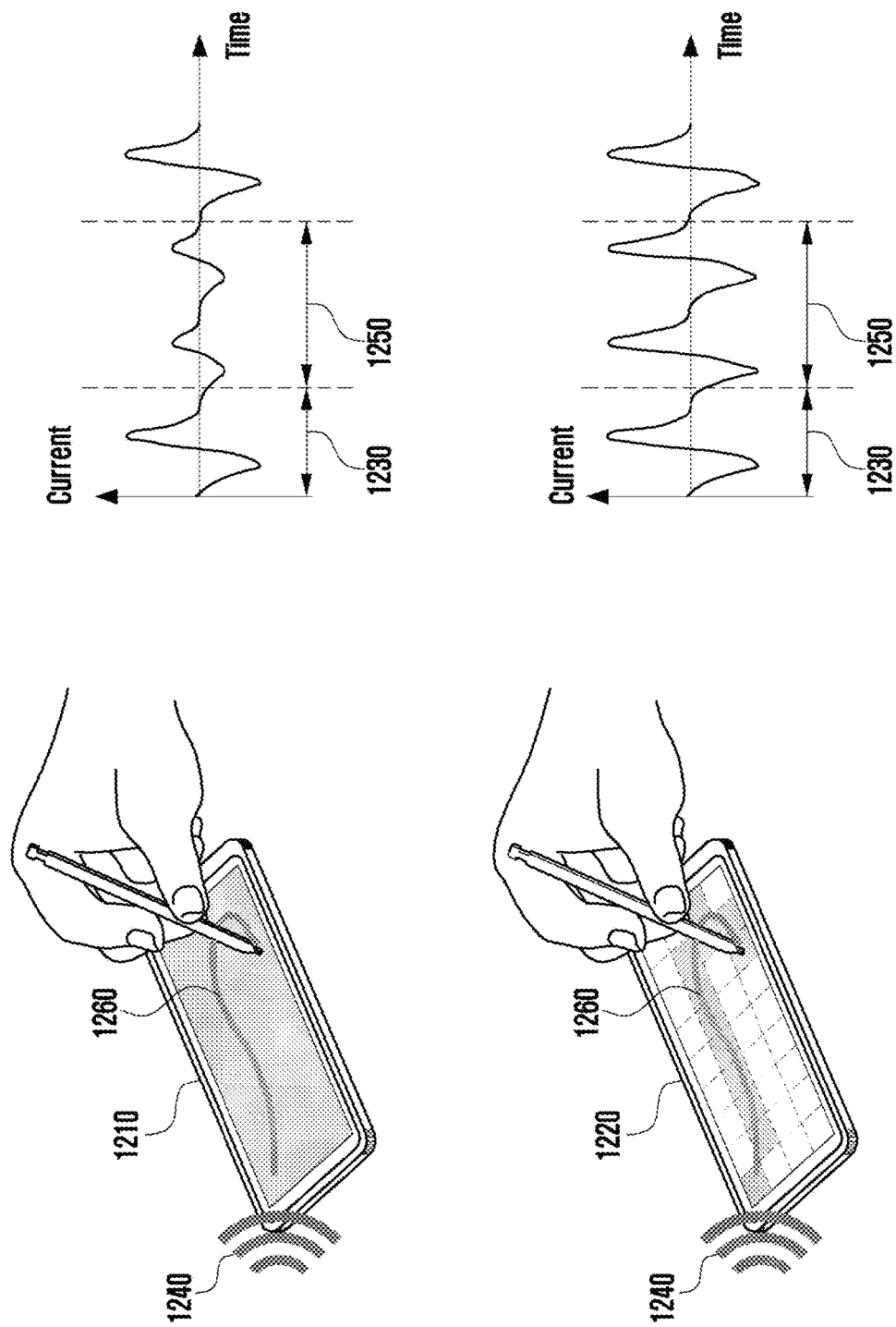
FIG. 12 illustrates a diagram of a difference in energy harvesting between a mobile electronic device having a latticed energy harvesting structure and a mobile electronic device having a non-latticed energy harvesting structure during a pen touch input.

FIG. 12 illustrates a diagram of a difference in energy harvesting between a mobile electronic device having a latticed energy harvesting structure and a mobile electronic device having a non-latticed energy harvesting structure during a pen touch input. With reference to FIG. 12, a first mobile electronic device 1210 may include a non-latticed energy harvesting structure (e.g., the energy harvesting element 500 of FIG. 5). A second mobile electronic device 1220 may include a latticed energy harvesting structure (e.g., the energy harvesting structure 700 of FIG. 7 or the energy harvesting structure 900 of FIG. 9).

The first mobile electronic device 1210 and the second mobile electronic device 1220 may harvest the same amount of energy from a sound input 1240 in a first time period 1230. In a second time period 1250, the sound input 1240 may be maintained, and a pen touch input 1260 may be transferred to the vibration membrane through the front cover and the display of the devices 1210 and 1220. In the first mobile electronic device 1210, tension caused by the pen touch input 1260 may be propagated to the entire vibration membrane. In the second mobile electronic device 1220, tension caused by the pen touch input 1260 may be limited to the lattice(s) to which the pen touch input 1260 is applied and may not propagate to other lattices. Accordingly, the second mobile electronic device 1220 may harvest electric energy more than the first mobile electronic device 1210.

The foldable electronic device (e.g., the electronic device 400 of FIG. 4) may have a wider display compared to other electronic devices (e.g., the electronic device 300 of FIG. 3). Further, a front cover attached onto the display so that the display can be folded may be made of a material (e.g., CPI) having lower hardness compared to glass. Accordingly, the probability of occurrence of a narrow disposition and/or excessive tension between the vibrating membrane and the electrode positioned under the vibrating membrane may increase. When a latticed energy harvesting structure is applied to a foldable electronic device, even while a contact input (e.g., hand touch input or pen touch input) is given, other lattices other than the lattice(s) to which the contact input is transferred may harvest electric energy from the sound input.

Figure 13:
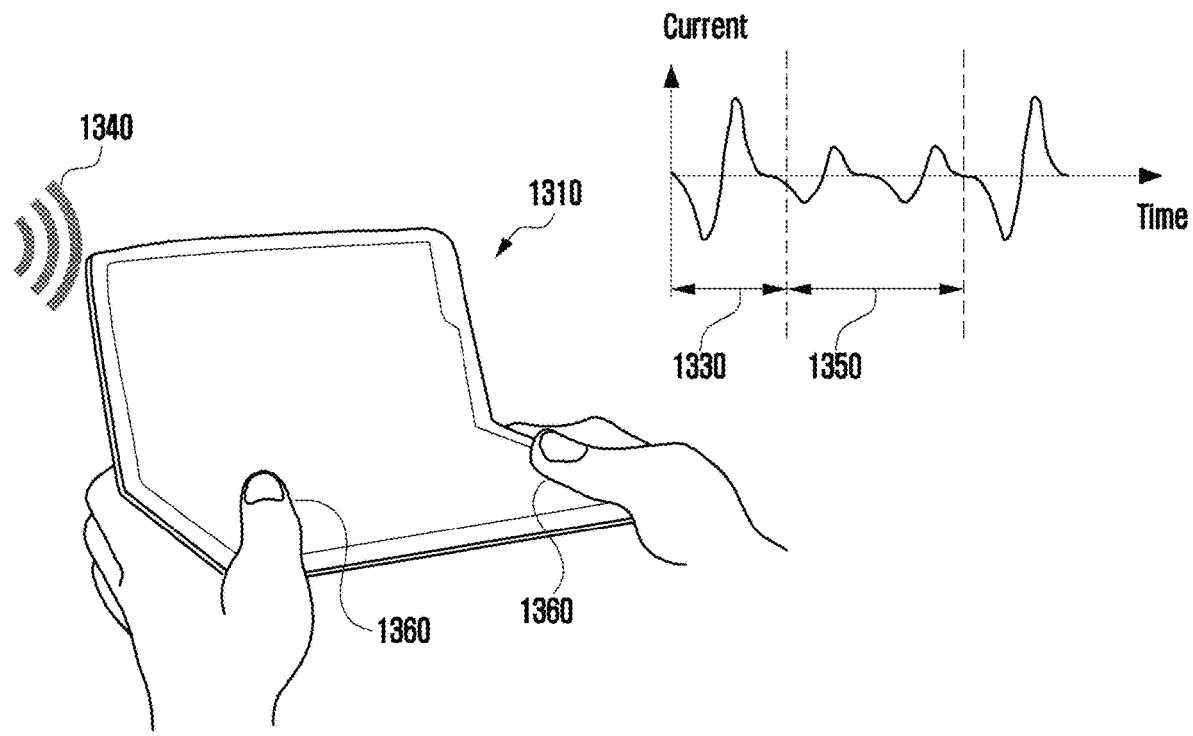
FIG. 13 illustrates a diagram of a difference in energy harvesting between a foldable electronic device having a latticed energy harvesting structure and a foldable electronic device having a non-latticed energy harvesting structure.
Figure 13:
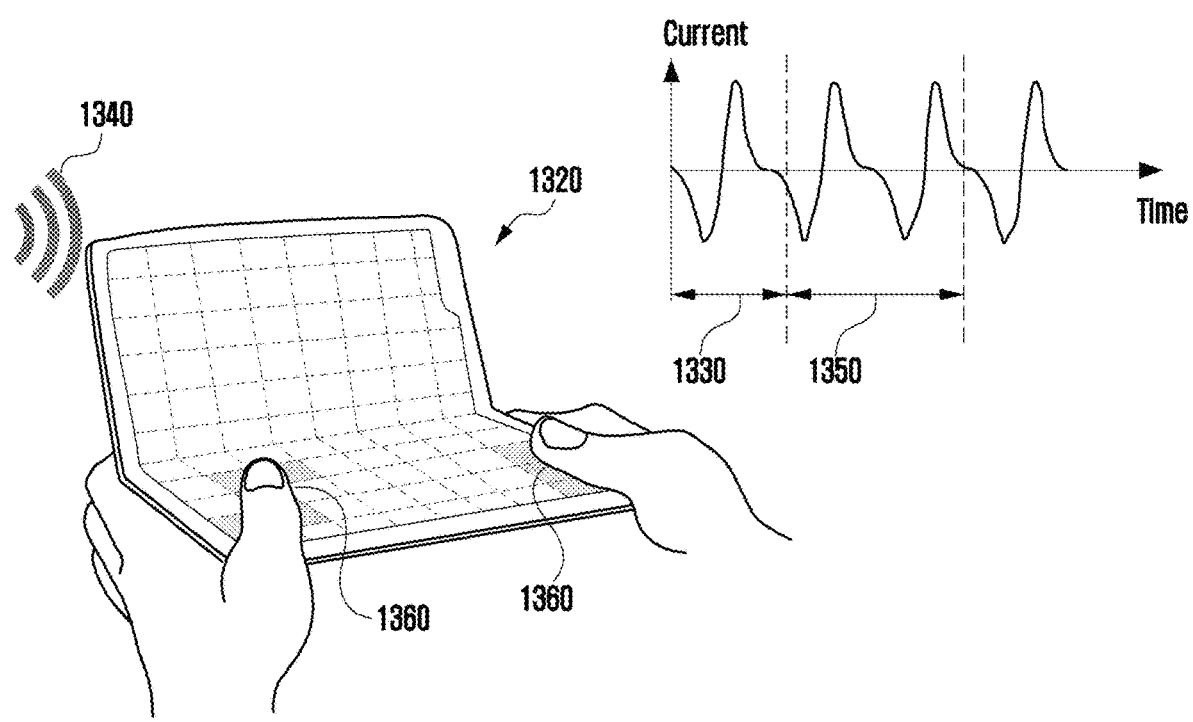

FIG. 13 illustrates a diagram of a difference in energy harvesting between a foldable electronic device having a latticed energy harvesting structure and a foldable electronic device having a non-latticed energy harvesting structure. With reference to FIG. 13, a first foldable electronic device 1310 may include a non-latticed energy harvesting structure (e.g., the energy harvesting element 500 of FIG. 5). A second foldable electronic device 1320 may include a latticed energy harvesting structure (e.g., the energy harvesting structure 700 of FIG. 7 or the energy harvesting structure 900 of FIG. 9).

The first foldable electronic device 1310 and the second foldable electronic device 1320 may harvest the same amount of energy from a sound input 1340 in a first time period 1330. In a second time period 1350, the sound input 1340 may be maintained, and a contact input 1360 may be transferred to the vibrating membrane through the front cover and the display of the devices 1310 and 1320. In the first foldable electronic device 1310, tension caused by the contact input 1360 may be propagated to the entire vibration membrane. In the second foldable electronic device 1320, tension caused by the contact input 1360 may be limited to the lattice(s) to which the contact input 1360 is applied and may not be propagated to other lattices. Accordingly, the second foldable electronic device 1320 may harvest electric energy more than the first foldable electronic device 1310.

Figure 14:
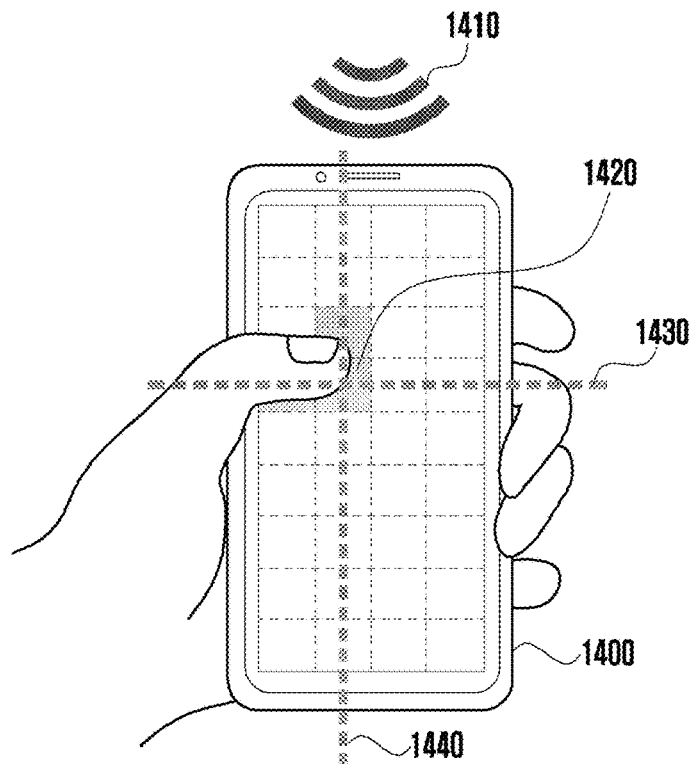
FIG. 14 illustrates a diagram of a noise measurement operation of an electronic device according to various embodiments.
Figure 14:
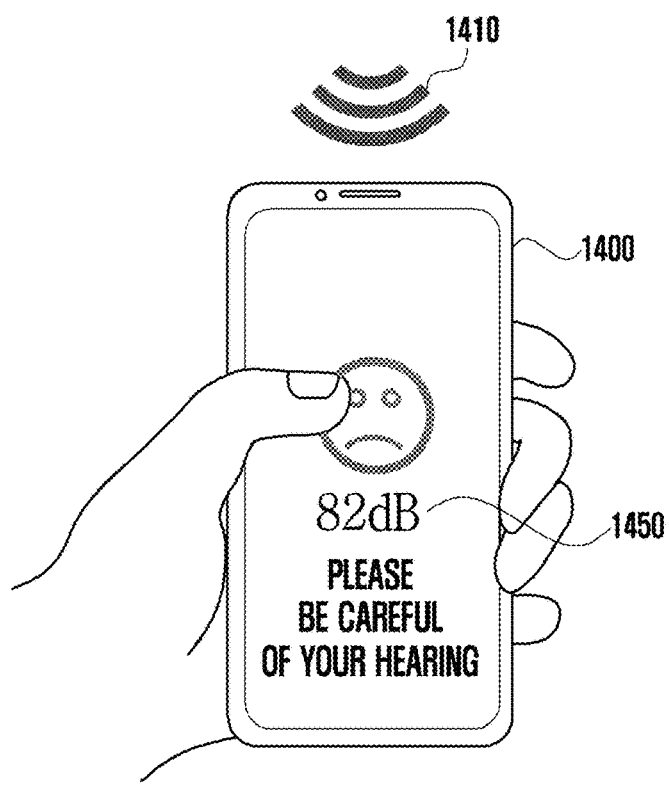

FIG. 14 illustrates a diagram of a noise measurement operation of an electronic device 1400 according to various embodiments. With reference to FIG. 14, the electronic device 1400 may include an energy harvesting structure (e.g., the energy harvesting structure 900 of FIG. 9) having a double-layered lattice vibration membrane.

In various embodiments, the electronic device 1400 may measure the intensity, for example, in units of decibels (dB) of the noise 1410 at a place where a user is positioned based on electric energy harvested by the energy harvesting structure, and provide the intensity to the user. In the noise measurement mode, the electronic device 1400 may recognize an x-axis line 1430 and a y-axis line 1440 of the vibration membrane to which a contact input 1420 is transferred. The electronic device 1400 may accurately measure the intensity of the noise 1410 by excluding a current value generated in the lines 1430 and 1440 when calculating the intensity of the noise, and provide a measured intensity value 1450 to the user.

Figure 15:
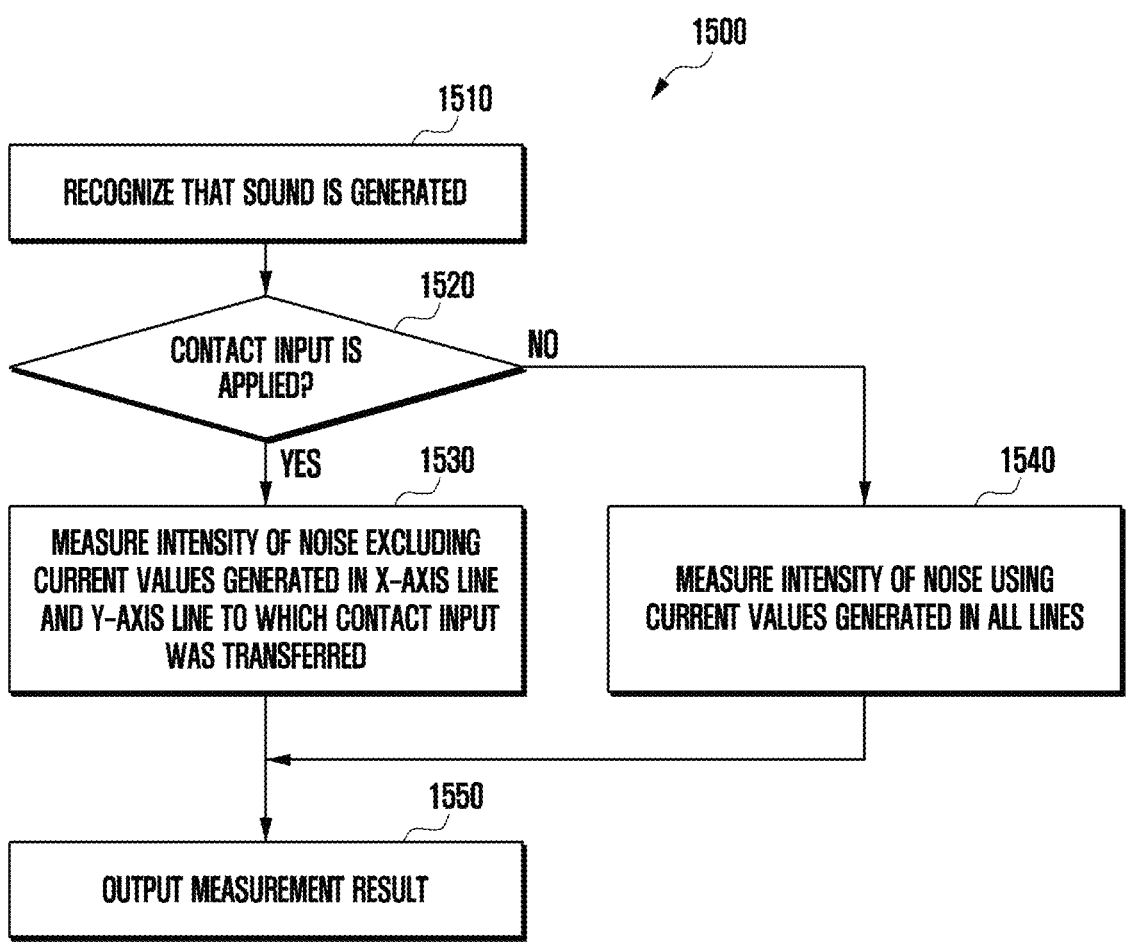
FIG. 15 illustrates a flowchart describing operations for measuring noise according to various embodiments.

FIG. 15 illustrates a flowchart describing operations 1500 for measuring noise according to various embodiments. The operations 1500 may be performed by a processor (e.g., the processor 1060 of FIG. 10) in a noise measurement mode.

In operation 1510, the processor may recognize that a sound (noise) is generated around the device based on an electric signal received from the energy harvesting structure (e.g., the energy harvesting structure 900 of FIG. 9). As another example, the processor may recognize that a sound (noise) is generated around the device based on an electrical signal received from the microphone.

In operation 1520, the processor may determine whether a contact input is applied to the display based on recognition of noise generation. For example, the processor may calculate a current value generated in each line by using the electric signal received from each line in the vibration membrane of the energy harvesting structure. When there is a current value exceeding a specified reference value (e.g., the first reference value) among the calculated current values, the processor may determine that a contact input has been applied to the display. As another example, the processor may calculate an amount of change per unit time of a current generated in each line, and when there is a change amount exceeding a specified reference value (e.g., the second reference value) among amounts of change, the processor may determine that a contact input has been applied to the display. As another example, the processor may determine whether a contact input is applied to the display based on an electrical signal received from a touch circuit embedded in the display.

If a contact input is applied to the display, in operation 1530, the processor may measure the intensity of noise using current values generated in the remaining lines excluding current values generated in an x-axis line and a y-axis line to which the contact input was transferred.

If no contact input is applied to the display, in operation 1540, the processor may measure the intensity of noise by using current values generated in all lines of the vibrating membrane.

In operation 1550, the processor may output the measurement result using a display and/or an audio output device.

According to various embodiments, the electronic device may simultaneously harvest electrical energy from an internal sound source (e.g., the sound output device 155 of FIG. 1) and/or a sound generated from an external sound source and a contact input (e.g., finger or pen touch input) to the display. In particular, as the vibrating membrane constituting the energy harvesting structure is latticed, a decrease in the ability to convert sound energy into electrical energy from tension generated as a reaction to the contact input may be prevented in various situations in which the contact input and the sound input exist simultaneously. Further, a double layer structure of the vibration membrane may replace or supplement the touch circuit, and support a function for measuring ambient noise and providing the result to the user.

In various embodiments, the above-described energy harvesting structure may be referred to as an energy harvesting module, an energy harvesting device, a current generation device, or a generator. It is illustrated that the above-described energy harvesting structure is positioned under the display, but it is not limited thereto, and when the energy harvesting structure is made of a transparent material, the energy harvesting structure may be positioned above the display, i.e., between the front cover and the display or may be a structure embedded in the display. A space formed by the above-described spacer may be referred to as a cell space or a lattice space.

An electronic device according to various embodiments may include a housing structure including a first cover facing in a first direction and forming a first surface of the electronic device, and a second cover facing in a second direction opposite to the first direction and forming a second surface of the electronic device; a display positioned in a space formed by the housing structure and exposed through the first surface; an energy harvesting structure (e.g., the energy harvesting structure 700 of FIG. 7A or the energy harvesting structure 900 of FIG. 9) positioned in the space and configured to generate a current from a contact input to the first surface and a sound input generated inside and outside the electronic device; a battery positioned in the space; and a charging circuit configured to charge the battery using the current received from the energy harvesting structure.

The energy harvesting structure may include a first positive charge charging member (e.g., the first positive charge charging member 711 of FIG. 7A or the first positive charge charging member 911 of FIG. 9) including a plurality of positive charge lattices and a plurality of connection portions connecting positive charge lattices adjacent to each other, and electrically connected to the charging circuit; a second positive charge charging member (e.g., the second positive charge charging member 720 of FIG. 7A or the second positive charge charging member 920 of FIG. 9) electrically connected to the charging circuit; a negative charge charging member (e.g., the negative charge charging member 712 of FIG. 7A or the negative charge charging member 912 of FIG. 9) positioned between the first positive charge charging member and the second positive charge charging member and including a plurality of negative charge lattices attached to the plurality of positive charge lattices, respectively; and a spacer (e.g., the spacer 730 of FIG. 7A or the spacer 930 of FIG. 9) configured with an insulator, and configured to form lattice spaces so that the positive charge lattices may vibrate, and to fix the connecting portions.

The spacer may include a first spacer (e.g., the first spacer 731 of FIG. 7A) including first fixing portions attached to an upper portions of the connecting portions to fix the connecting portions when the positive charge lattices vibrate, and configured to form first lattice spaces so that the positive charge lattices can move upward; and a second spacer (e.g., the second spacer 732 of FIG. 7A) including second fixing portions attached to a lower portions of the connection portions to fix the connection portions when the positive charge lattices vibrate, and configured to form second lattice spaces so that the positive charge lattices can move downward.

The first positive charge charging member may include first lines arranged in a first layer in a third direction perpendicular to the first direction; and second lines arranged in a second layer in a fourth direction crossing the third direction. The spacer may include a first spacer (e.g., the first spacer 931 of FIG. 9) including a first fixing portion attached to a lower portion of first connection portions of the first lines to fix the first connection portions when first positive charge lattices of the first lines vibrate and configured to form lattice spaces so that the first positive charge lattices can move upward and to form lattice spaces so that second positive charge lattices of the second lines can move upward; a second spacer (e.g., the second spacer 932 of FIG. 9) including a second fixing portion positioned between the first lines and the second lines, and attached to lower portions of the first connecting portions and upper portions of second connecting portions of the second lines to fix the first connecting portions and the second connecting portions when the first positive charge lattices and the second positive charge lattices vibrate, and configured to form lattice spaces so that the first positive charge lattices can move downward, and to form lattice spaces so that the second positive charge lattices can move upward; and a third spacer (e.g., the third spacer 933 of FIG. 9) including a third fixing portion attached to a lower portion of the second connection portions to fix the second connection portions when the second positive charge lattices vibrate and configured to form lattice spaces so that the first positive charge lattices can move downward and to form lattice spaces so that the second positive charge lattices can move downward.

The electronic device may further include a processor (e.g., the processor 1050 of FIG. 10) configured to measure noise based on a current generated in the first lines and the second lines; and a switch (e.g., the switch 1020 of FIG. 10) configured to sequentially connect the first lines and the second lines one by one to the processor, or to connect both the first lines and the second lines to the charging circuit. The processor may be configured to sequentially receive electrical signals from the first lines and the second lines through the switch, to calculate current values generated in the first lines and the second lines using the sequentially received electrical signals, to calculate intensity values corresponding to each of the calculated current values, and to determine an average of the intensity values as the intensity value of the noise.

The switch may include a first switch and a second switch. The first switch may include terminals connected to each of the first lines and the second lines, and sequentially connect the terminals one by one to the second switch or connect all of the terminals to the second switch based on the control of the processor. The second switch may include a first terminal connected to the processor and a second terminal connected to the charging circuit, and connect the first switch to the first terminal or the second terminal based on the control of the processor.

The processor may be configured to recognize a contact input on the display based on a current generated in the first lines and the second lines.

The processor may be configured to exclude a current generated in a line in which the contact input is transferred, when measuring noise.

The processor may be configured to display a message requesting interruption of the contact on the display based on recognition of the contact input.

The processor may be configured to control the switch to sequentially connect the first lines and the second lines one by one thereto based on execution of a noise measurement application, and to control the switch to connect both the first lines and the second lines to the charging circuit based on the end of execution of the noise measurement application.

The processor may be configured to control the switch to connect both the first lines and the second lines to the charging circuit based on execution of a specified application (e.g., game application).

The processor may be configured to control the switch to connect both the first lines and the second lines to the charging circuit based on execution of a function using a digital pen.

The energy harvesting structure may be attached to a flexible display that can be folded and unfolded.

The energy harvesting structure may be disposed under the display when facing the first surface from above the first cover.

The first cover may be made of a material having lower hardness than that of glass.

An electronic device according to various embodiments may include a hinge structure; a first housing structure including a first front cover forming a portion of a first surface of the electronic device and a first rear cover forming a portion of a second surface of the electronic device; a second housing structure including a second front cover rotatably coupled to the first housing structure through the hinge structure and forming another portion of the first surface, and a second rear cover forming another portion of the second surface; a display positioned in a space formed by the first housing structure and the second housing structure and exposed through the first surface; an energy harvesting structure positioned in the space and configured to generate a current from a contact input to the first surface and a sound input generated inside and outside the electronic device; a battery positioned in the space; and a charging circuit configured to charge the battery using a current received from the energy harvesting structure.

The first front cover and the second front cover may be made of a material having lower hardness than that of glass.

According to various embodiments, an electronic device can simultaneously harvest electrical energy from a sound generated from an internal sound source (e.g., built-in speaker) and/or an external sound source, and a contact input (e.g., finger or pen touch input) to a display.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a housing structure comprising a first cover facing in a first direction and forming a first surface of the electronic device, and a second cover facing in a second direction opposite to the first direction and forming a second surface of the electronic device;
a display positioned in a space formed by the housing structure and exposed through the first surface;
an energy harvesting structure positioned in the space and configured to generate a current from a contact input to the first surface and a sound input generated inside and outside the electronic device;
a battery positioned in the space; and
a charging circuit configured to charge the battery using the current received from the energy harvesting structure,
wherein the energy harvesting structure comprises:
a first positive charge charging member comprising a plurality of positive charge lattices and a plurality of connection portions connecting positive charge lattices adjacent to each other, and electrically connected to the charging circuit;
a second positive charge charging member electrically connected to the charging circuit;
a negative charge charging member positioned between the first positive charge charging member and the second positive charge charging member and comprising a plurality of negative charge lattices, each attached respectively to each of the plurality of positive charge lattices; and
a spacer configured with an insulator and configured to form lattice spaces enabling the positive charge lattices to vibrate, and to fix the plurality of connection portions.

2. The electronic device of claim 1, wherein the spacer comprises:
a first spacer comprising first fixing portions attached to an upper portion of the plurality of connection portions to fix the plurality of connection portions when the positive charge lattices vibrate, and configured to form first lattice spaces to enable the positive charge lattices to move upward; and
a second spacer comprising second fixing portions attached to a lower portion of the plurality of connection portions to fix the plurality of connection portions when the positive charge lattices vibrate, and configured to form second lattice spaces to enable the positive charge lattices to move downward.

3. The electronic device of claim 1, wherein the first positive charge charging member comprises:
first lines arranged in a first layer in a third direction perpendicular to the first direction; and
second lines arranged in a second layer in a fourth direction crossing the third direction.

4. The electronic device of claim 3, wherein the spacer comprises:
a first spacer comprising a first fixing portion attached to a lower portion of first connection portions of the first lines to fix the first connection portions when first positive charge lattices of the first lines vibrate and configured to form lattice spaces to enable the first positive charge lattices to move upward, and form lattice spaces to enable second positive charge lattices of the second lines to move upward;
a second spacer comprising a second fixing portion positioned between the first lines and the second lines, and attached to lower portions of the first connection portions and upper portions of second connection portions of the second lines to fix the first connection portions and the second connection portions when the first positive charge lattices and the second positive charge lattices vibrate, and configured to form lattice spaces to enable the first positive charge lattices to move downward, and form lattice spaces to enable the second positive charge lattices to move upward; and
a third spacer comprising a third fixing portion attached to a lower portion of the second connection portions to fix the second connection portions when the second positive charge lattices vibrate and configured to form lattice spaces to enable the first positive charge lattices to move downward and form lattice spaces to enable the second positive charge lattices to move downward.

5. The electronic device of claim 3, further comprising:
a processor configured to measure noise based on a current generated in the first lines and the second lines; and
a switch configured to sequentially connect the first lines and the second lines one by one to the processor or to connect both the first lines and the second lines to the charging circuit.

6. The electronic device of claim 5, wherein the processor is configured to:
sequentially receive electrical signals from the first lines and the second lines through the switch;
calculate current values generated in the first lines and the second lines using the sequentially received electrical signals;
calculate intensity values corresponding to each of the calculated current values; and
determine an average of the intensity values as the intensity value of the measured noise.

7. The electronic device of claim 5, wherein the switch comprises a first switch and a second switch,
wherein the first switch comprises terminals connected to each of the first lines and the second lines, and the processor is configured to control the first switch to sequentially connect the terminals one by one to the second switch or connect all of the terminals to the second switch; and
wherein the second switch comprises a first terminal connected to the processor and a second terminal connected to the charging circuit, and the processor is configured to control the second switch to connect the first switch to the first terminal or the second terminal.

8. The electronic device of claim 5, wherein the processor is configured to recognize a contact input on the display based on the current generated in the first lines and the second lines.

9. The electronic device of claim 8, wherein the processor is configured to exclude a current generated in a line in which the contact input is transferred, when measuring noise.

10. The electronic device of claim 8, wherein the processor is configured to display a message requesting contact interruption on the display based on recognition of the contact input.

11. The electronic device of claim 5, wherein the processor is configured to:
control the switch to sequentially connect the first lines and the second lines one by one thereto based on execution of a noise measurement application; and control the switch to connect both the first lines and the second lines to the charging circuit based on an end of the execution of the noise measurement application.

12. The electronic device of claim 5, wherein the processor is configured to control the switch to connect both the first lines and the second lines to the charging circuit based on execution of a specific application.

13. The electronic device of claim 5, wherein the processor is configured to control the switch to connect both the first lines and the second lines to the charging circuit based on execution of a function using a digital pen.

14. The electronic device of claim 1, wherein the energy harvesting structure is attached to a flexible display that is configured to fold and unfold.

15. The electronic device of claim 1, wherein the energy harvesting structure is disposed under the display when facing the first surface from above the first cover.

16. The electronic device of claim 1, wherein the first cover is made of a material with a hardness level that is less than a hardness level of glass.

17. The electronic device of claim 1, further comprising a hinge structure, and wherein the housing structure comprises:

a first housing structure comprising a first front cover forming a portion of a first surface of the electronic device and a first rear cover forming a portion of a second surface of the electronic device; and a second housing structure comprising a second front cover rotatably coupled to the first housing structure through the hinge structure and forming another portion of the first surface, and a second rear cover forming another portion of the second surface.

18. The electronic device of claim 17, wherein the first front cover and the second front cover are made of a material with a hardness level that is less than a hardness level of glass.

* * * * *